(12) United States Patent
Hirata et al.

(10) Patent No.: US 7,954,313 B2
(45) Date of Patent: Jun. 7, 2011

(54) EXHAUST CLEANER FOR INTERNAL COMBUSTION ENGINE

(75) Inventors: Hirohito Hirata, Shizuoka-ken (JP);
Masaru Kakinohana, Susono (JP);
Masaya Ibe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 462 days.

(21) Appl. No.: 12/090,500

(22) PCT Filed: Oct. 17, 2006

(86) PCT No.: PCT/JP2006/320996
§ 371 (c)(1),
(2), (4) Date: Apr. 17, 2008

(87) PCT Pub. No.: WO2007/046519
PCT Pub. Date: Apr. 26, 2007

(65) Prior Publication Data
US 2009/0120070 A1    May 14, 2009

(30) Foreign Application Priority Data

Oct. 18, 2005  (JP) ................................. 2005-303073
Oct. 18, 2005  (JP) ................................. 2005-303075
Apr. 24, 2006  (JP) ................................. 2006-119707

(51) Int. Cl.
*F01N 3/00* (2006.01)

(52) U.S. Cl. ................ 60/286; 60/287; 60/292; 60/293; 60/295; 60/303; 60/311

(58) Field of Classification Search ............ 60/274, 60/286, 287, 289, 292, 293, 295, 297, 303, 60/311
See application file for complete search history.

(56) References Cited

U.S. PATENT DOCUMENTS

| | | | |
|---|---|---|---|
| 6,912,841 B2 * | 7/2005 | Pfendtner et al. | 60/275 |
| 7,121,079 B2 * | 10/2006 | Calvo et al. | 60/275 |
| 7,331,170 B2 * | 2/2008 | Shimoda | 60/286 |
| 2006/0162297 A1 | 7/2006 | Hartherz | |
| 2009/0308060 A1 * | 12/2009 | Suzuki et al. | 60/311 |

FOREIGN PATENT DOCUMENTS

| | | |
|---|---|---|
| DE | 102 41 063 | 3/2004 |
| EP | 1 405 663 | 4/2004 |
| EP | 1 544 425 | 6/2005 |

(Continued)

OTHER PUBLICATIONS

Extended European Search Report for EP Appl. No. 06812115.1 dated Oct. 8, 2010.

(Continued)

*Primary Examiner* — Binh Q Tran
(74) *Attorney, Agent, or Firm* — Finnegan, Henderson, Farabow, Garrett & Dunner, LLP

(57) ABSTRACT

An exhaust purifying system for an internal combustion engine is provided with a plurality of DPFs (30*a* and 30*b*) branched and connected to an exhaust passage (15) for collecting particulate matter in an exhaust gas and an ozone supplier for supplying ozone to the upstream side of each of the plurality of DPFs (30*a* and 30*b*). The system respectively changes a ratio of a supply amount of the exhaust gas and a ratio of a supply amount of the ozone between the plurality of DPFs (30*a* and 30*b*).

19 Claims, 26 Drawing Sheets

FOREIGN PATENT DOCUMENTS

| | | |
|---|---|---|
| EP | 1 669 563 | 6/2005 |
| FR | 2907845 A1 * | 5/2008 ...................... 60/286 |
| JP | 57-60110 | 4/1982 |
| JP | 6-272541 | 9/1994 |
| JP | 6-288224 | 10/1994 |
| JP | 7-305622 | 11/1995 |
| JP | 9-125931 | 5/1997 |
| JP | 9-317444 | 12/1997 |
| JP | 2002-531762 | 9/2002 |
| JP | 2004-353596 | 12/2004 |
| JP | 2005-502823 | 1/2005 |
| JP | 2005-504207 | 2/2005 |
| JP | 2005-538295 | 12/2005 |
| WO | WO 00/34632 | 6/2000 |
| WO | WO 03/026778 A1 | 4/2003 |
| WO | WO 2004/024301 A1 | 3/2004 |

OTHER PUBLICATIONS

Decision to Grant a Patent dated Apr. 20, 2010 for Japanese Patent Appl. No. 2007-541070.

* cited by examiner

EXHAUST CLEANER FOR INTERNAL COMBUSTION ENGINE

TECHNICAL FIELD

The present invention relates to an exhaust purifying system for an internal combustion engine and in particular, to an exhaust purifying system for an internal combustion engine which collects and oxidizes particulate matter in exhaust gas emitted from a diesel engine for purifying it.

BACKGROUND ART

There is generally known that exhaust gas in a diesel engine contains particulate matter (hereinafter, referred to as "PM") including carbon as a major constituent, which is the cause of air contamination. Therefore, there are proposed various systems and methods for trapping and removing the PM from the exhaust gas.

For example, there are proposed methods such as a method that fuel is forcibly injected and supplied to increase a temperature of a diesel particulate filter (DPF) for oxidizing and burning the collected PM, a method that nitrogen dioxide $NO_2$ is generated from nitrogen monoxide NO in exhaust gas and PM is oxidized by $NO_2$ (for example, Japanese Patent Laid-Open No. 2002-531762), and a method of oxidizing PM by using a DPF with a catalyst (for example, Japanese Patent Laid-Open No. 06-272541 or Japanese Patent Laid-Open No. 09-125931). However, the proposed methods have the following problems. The method of forcibly injecting and supplying fuel has the problem of inviting deterioration of fuel consumption and also damages of the DPF caused by a temperature rise as a result of rapid combustion of PM, the method described in Japanese Patent Laid-Open No. 2002-531762 has the problem that due to slowness of an oxidizing speed of PM by $NO_2$, it is difficult to completely oxidize and remove PM emitted from an engine, and the method of using DPF with a catalyst described in Japanese Patent Laid-Open No. 06-272541 or Japanese Patent Laid-Open No. 09-125931 has the problem that since the catalyst and PM both are solid substances, both do not sufficiently contact, causing an insufficient oxidative reaction of the PM.

Therefore, there is disclosed the technique of oxidizing and processing PM using ozone $O_3$ having a stronger oxidation effect as compared to $NO_2$ (for example, Japanese Patent Laid-Open No. 2005-502823). In a method and a system of performing post-treatment of an exhaust gas in a diesel engine described in Japanese patent laid-Open No. 2005-502823, a device for generating ozone or $NO_2$ as an oxidant from the exhaust gas by plasma is disposed at the upstream side of a particulate filter and is designed to oxidize and remove soot collected in the particulate filter by selectively using ozone and $NO_2$ at a low temperature and $NO_2$ at a high temperature in response to a temperature of the emission gas.

The method and the system of performing post-treatment of exhaust gas in a diesel engine described in Japanese Patent laid-Open No. 2005-502823 use ozone having a stronger oxidation effect as compared to $NO_2$, and therefore, can be appreciated in terms of an improvement in oxidation removal capabilities on PM. However, since the method described in Japanese Patent Laid-Open No. 2005-502823 is adapted to generate ozone from oxygen as a constituent in exhaust gas by plasma and introduce the generated ozone as well as the exhaust gas containing NOx and the like into a particulate filter, a generation amount of ozone is not sufficient and ozone having a strong oxidation effect possibly reacts with and is consumed in the NOx and the like in the exhaust gas before entering into the particulate filter. Therefore, there is a problem that an amount of ozone usable for oxidation and removal of PM is reduced and a sufficient purification efficiency can not be obtained, thereby possibly deteriorating an oxidation speed of PM.

Therefore, an object of the present invention is to provide an exhaust purifying system for an internal combustion engine which enables ozone to be efficiently used at the time of oxidizing and removing PM by using ozone.

DISCLOSURE OF THE INVENTION

An exhaust purifying system for an internal combustion engine according the present invention comprises a plurality of particulate matter collecting devices branched and connected to an exhaust passage for collecting particulate matter in an exhaust gas, ozone supplying means for supplying ozone to an upstream side of each of said plurality of particulate matter collecting devices, and controlling means for changing a ratio of a supply amount of the exhaust gas and a ratio of a supply amount of the ozone between said plurality of particulate matter collecting devices.

According to the exhaust purifying system for the internal combustion engine, since the ratio of the supply amount of the exhaust gas between said plurality of particulate matter collecting devices is adapted to be changed, the particulate matter collecting device can restrict consumption of the ozone by a certain substance in the exhaust gas, such as NOx or HC and restrict decomposition of the ozone due to heat of the exhaust gas in a particulate matter collecting device where the ratio of the supply amount in the exhaust gas is made small. In consequence, the ozone is efficiently usable, making it possible to improve a purification efficiency of PM by the ozone.

Preferably, the system according to the present invention is further provided with at least one catalyst device disposed in said exhaust passage at an upstream side of plurality of the particulate matter collecting devices to remove a predetermined substance in the exhaust gas.

The device according to the present invention may be further provided with collection amount detecting means for detecting a collection amount of each of said plurality of particulate matter collecting devices, and temperature detecting means for detecting a temperature of each of said plurality of particulate matter collecting devices, wherein said controlling means controls the ratio of the supply amount of the exhaust gas based upon the collection amount detected by said collection amount detecting means and controls the ratio of the supply amount of the ozone based upon the temperature detected by said temperature detecting means. In this case, the oxidation and removal of PM can be executed in preference in the particulate matter collecting device having high necessity of the oxidation and removal of PM.

It is preferable that said controlling means makes the ratio of the supply amount of the ozone relatively large for said particulate matter collecting device in which the ratio of the supply amount of the exhaust gas is made relatively small. Here, "the ratio of the supply amount of the exhaust gas is made relatively small" means a state where the ratio of the supply amount of the exhaust gas is made smaller than in at least one of the other particulate matter collecting devices. Likewise, "the ratio of the supply amount of the ozone is made relatively small" means a state where the ratio of the supply amount of the ozone is made smaller than in at least one of the other particulate matter collecting devices.

It is preferable that the system according to the present invention is capable of individually and fully closing passages of the exhaust gas to said plurality of particulate matter collecting devices and individually and fully closing passages of the ozone to said plurality of particulate matter collecting devices.

The system according to the present invention may be further provided with collection amount detecting means for detecting a collection amount of each of said plurality of particulate matter collecting devices, wherein said controlling means selects a particulate matter collecting device in which the collection amount is small among said plurality of particulate matter collecting devices, as an object for supplying the exhaust gas. Here, "the collection amount is small" means that the collection amount is smaller than in at least one of the other particulate matter collecting devices.

Said controlling means may, in a case where the temperature of the particulate matter collecting device in which the collection amount is relatively large among said plurality of particulate matter collecting devices is less than a predetermined low temperature-side reference value, sets a supply amount of the ozone to the particulate matter collecting device at a predetermined maximum amount and in a case where the temperature of the particulate matter collecting device is more than the low temperature-side reference value, set a supply amount of the ozone to particulate matter collecting device based upon NOx density in the exhaust gas. Here, "the collection amount is relatively large" means that the collection amount is larger than in at least one of the other particulate matter collecting devices.

Said controlling means may, in a case where the temperature of the particulate matter collecting device in which the collection amount is relatively large among the plurality of particulate matter collecting devices is less than a predetermined low temperature-side reference value, select a particulate matter collecting device in which the collection amount is relatively small as an object for supplying the ozone. Here, "the collection amount is relatively large" means that the collection amount is larger than in at least one of the other particulate matter collecting devices and "the particulate matter collecting device in which the collection amount is relatively small" means at least one of the particulate matter collecting devices other than the particulate matter collecting device in which the collection amount is relatively large.

Said controlling means may stop the supply of said ozone from the ozone supplying means in a case where the temperature exceeds a predetermined high-temperature reference value.

In the system according to the present invention, said plurality of particulate matter collecting devices may be further provided with temperature increasing means, wherein said controlling means controls said temperature increasing means to increase a temperature of the particulate matter collecting device in a case where the temperature of the particulate matter collecting device selected as an object for supplying the exhaust gas exceeds a predetermined high-temperature reference value.

In a case where the system according to the present invention is provided with at least one catalyst device, it is preferable that the system is further provided with catalyst temperature detecting means for detecting a temperature of said at least one catalyst device, wherein the controlling means controls said ozone supplying means based upon the temperature of said at least one catalyst device.

It is preferable that the system according to the present invention is provided with an exhaust control valve at a branch point of the exhaust passage for changing the ratio of the supply amount of the exhaust gas between said plurality of particulate matter collecting devices.

It is preferable that the ozone supplying means in the present invention is provided with an ozone control valve for changing the ratio of the supply amount of the ozone from a single ozone supplying source between said plurality of particulate matter collecting devices.

Another aspect of the present invention is preferably provided with said particulate matter collecting device including a plurality of filter chambers neighboring with each other and defined in parallel to the flow direction of the exhaust gas in a single casing, a filter member disposed in each of said plurality of filter chambers, and valve means for switching between said plurality of filter chambers into which the exhaust gas enters, wherein said ozone supplying means is disposed in each of said plurality of filter chambers, and said valve means is disposed at the upstream side of said ozone supplying means.

According to this aspect of the present invention, the filter chamber into which the ozone is supplied by the ozone supplying means can be closed by the valve means to restrict inflow of the exhaust gas into the filter chamber. Accordingly, it is prevented that the supplied ozone is wastefully consumed by the NOx in the exhaust gas or the like and therefore, a greater amount of the ozone can be used for oxidation and removal of PM deposited in the filter member. Therefore, the ozone can be efficiently used. In this case, it is preferable that said plurality of filter chambers are two chambers, one formed in the central portion and another in an outer peripheral portion inside said casing.

It is preferable that said valve means switches between said plurality of filter chambers so that the exhaust gas does not enter into the filter chamber to which the ozone is supplied from said ozone supplying means and the exhaust gas enters into the filter chamber to which the ozone is not supplied from said ozone supplying means.

It is preferable that said valve means is provided with a first valve body for opening/closing a part of said plurality of filter chambers, a second valve body for opening/closing the rest of said plurality of filter chambers and drive means for driving said first valve body and said second valve body so that said first valve body and said second valve body alternately open and close in accordance with the filter chamber to which the ozone is supplied.

It is preferable that the system of the present invention is provided with at least one temperature detecting means for detecting a temperature of the gas entering into at least one of said filter members or a temperature of the one of the filter members and means for controlling the ozone supply from said ozone supplying means corresponding to the filter member based upon the detected temperature. In a case of oxidizing and removing PM in the filter member due to ozone, it is preferable to oxidize and remove PM when a temperature of the gas entering into the filter member or a temperature of the filter member is within such an appropriate temperature range that the PM oxidation due to the ozone can be effectively performed. According to the preferred aspect, the ozone supply can be performed only when the detected temperature is within the appropriate temperature range, preventing the supplied ozone from being wastefully consumed in an inappropriate temperature range.

It is preferable that in this case the system is provided with cooling gas supplying means disposed between at least one of said filter members and said valve means for supplying a cooling gas to the filter member from the upstream side thereof, and means for controlling the cooling gas supply from the cooling gas supplying means in accordance with the detected temperature. According to this preferred aspect, in a case where a temperature in accordance with the filter member performing PM oxidation and removal is higher than the appropriate temperature range, supply of the cooling air is performed from the air supplying means, making it possible to reduce the temperature to the appropriate temperature range. In consequence, the ozone supply can be performed within the appropriate temperature range, preventing the supplied ozone from being wastefully consumed in an inappropriate temperature range.

BEST MODE OF CARRYING OUT THE INVENTION

Hereinafter, embodiments of the present invention will be explained with reference to the accompanying drawings.

First Embodiment

Figure 1:
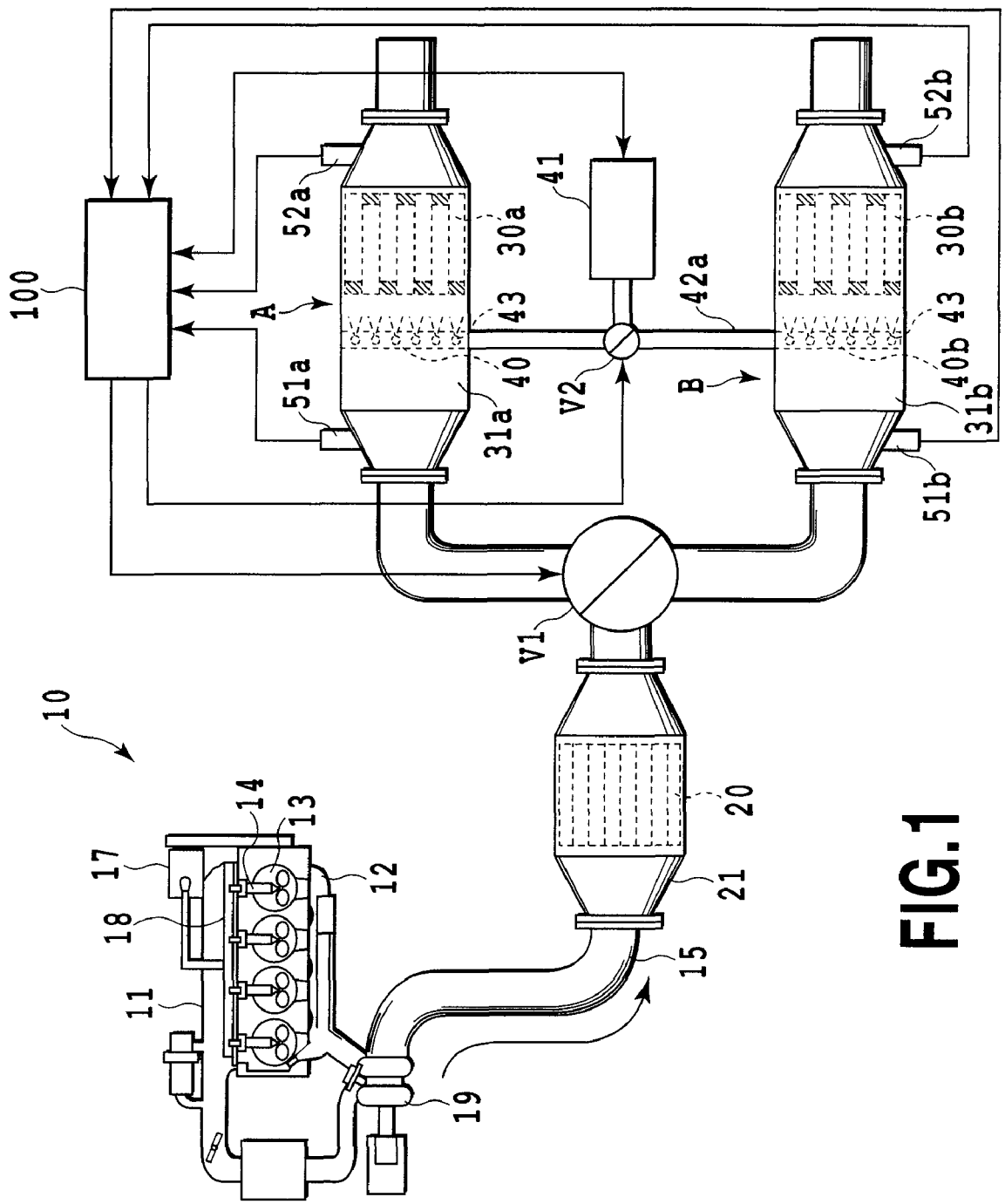
FIG. 1 is a system diagram schematically showing an exhaust purifying system for an internal combustion engine in a first embodiment of the present invention.

FIG. 1 is a system diagram schematically showing an exhaust purifying system for an internal combustion engine in a first embodiment of the present invention. In the figure, numeral 10 denotes a compression ignition type internal combustion engine, i.e., a diesel engine, numeral 11 denotes an intake manifold communicated to intake ports, numeral 12 denotes an exhaust manifold communicated to exhaust ports and numeral 13 denotes a combustion chamber. In the present embodiment, fuel supplied to a high-pressure pump 17 from a fuel tank (not shown) is supplied under pressure to a common rail 18 by the high-pressure pump 17 and accumulated therein in a high-pressure state and the high-pressure fuel in the common rail 18 is directly injected and supplied into the combustion chamber 13 from a fuel injection valve 14. Exhaust gas from the diesel engine 1 flows from the exhaust manifold 12 to a turbocharger 19 and thereafter, flows into a exhaust passage 15 at the downstream side thereof. Further the exhaust gas is subject to purification treatment as described later, and is discharged into the air. It should be noted that form of the diesel engine is not limited to such a common rail type fuel injection device. Further, another exhaust purifying device such as an EGR device may be arbitrarily included.

The exhaust passage 15 is provided with a NOX catalyst 20 disposed therein for purifying NOx in the exhaust gas and diesel particulate filters (hereinafter, referred to as DPF) 30a and 30b disposed therein as a particulate matter collecting device for collecting particulate matter (PM) in the exhaust gas. DPFs 30a and 30b are connected via an exhaust control valve V1 to the exhaust passage 15 branched at the downstream side of the NOx catalyst 20.

In addition, ozone supplying nozzles 40a and 40b, as ozone supplying means capable of supplying ozone to DPFs 30a and 30b, are disposed between the NOx catalyst 20 and DPFs 30a and 30b, in other words, at the downstream side of the NOx catalyst 20 and the exhaust control valve V1 and at the upstream side of DPFs 30a and 30b. An ozone generator 41, as an ozone supplying source, is branched and connected via an ozone control valve V2 to the ozone supplying nozzles 40a and 40b. Ozone generated in the ozone generator 41 is supplied via the ozone control valve V2 and ozone supplying passages 42a and 42b to the ozone supplying nozzles 40a and 40b and is injected and supplied in the exhaust passage 15 from the ozone supplying nozzles 40a and 40b toward DPFs 30a and 30b adjacent thereto at the downstream side thereof.

Each of the ozone supplying nozzles 40a and 40b is disposed at a position directly upstream of each of DPFs 30a and 30b and supplies ozone toward each of DPFs 30a and 30b so that ozone supplied from the ozone supplying nozzles 40a and 40b is not wastefully consumed by reaction to NOx or unburned constituents (CO, HC and the like) in the exhaust gas. In addition, each of the ozone supplying nozzles 40a and 40b has a plurality of ozone supplying ports 43 so wide as to cover the entire diameter of the upstream end surface of each of DPFs 30a and 30b so that ozone can be supplied uniformly on the entire upstream end surface of each of DPFs 30a and 30b. Each of the ozone supplying nozzles 40a and 40b extends in the diameter direction of each of casings 31a and 31b to be fixed to each of the casings 31a and 31b. DPF 30a, the casing 31a and the ozone supplying nozzle 40a constitute a unit A. DPF 30b, the casing 31b and the ozone supplying nozzle 40b constitute a unit B. It should be noted that the ozone supplying means may have various forms other than the ozone supplying nozzles 40a and 40b. For example, in a case of one ozone supplying port only, a distance between the ozone supplying port and the upstream end surface of DPF is made in such a manner that ozone can spread uniformly over the entire upstream end surface of the DPF.

An example of the ozone generator 41 may include a generator for generating ozone while flowing dried air or oxygen as a raw material in a discharge tube to which a high voltage can be applied or another arbitrary form thereof. Here, the dried air or oxygen as a raw material, differently from that in Japanese Patent Laid-Open No. 2005-502823, is a gaseous body taken in from an outside of the exhaust passage 15, for example, a gaseous body contained in ambient air and is not air contained in exhaust gas as in the case of the above document. In the ozone generator 41, a generation efficiency of ozone is higher in a case of using raw material gaseous body at a low temperature than in a case of using raw material gaseous body at a high temperature. Accordingly, by using the gaseous body outside of the exhaust passage 15, it is possible to improve the generation efficiency of ozone as compared to the case of the above document. It should be noted that the air or oxygen used in the present invention is not limited to the dried state thereof.

Each of the exhaust control valve V1 and the zone control valve V2 is a three-way valve including a solenoid and is a switching valve which can fully close one of two directions of discharge ports at the downstream side thereof and fully open the other.

Each of DPFs 30a and 30b is supported through a support member (not shown) in each of the cylindrical, metallic casings 31a and 31b both ends of which are formed in a frusto-conical shape. The support member has insulation properties, heat resistance, buffer properties and the like and for example, is formed of an alumina mat. DPF 30a and the ozone supplying nozzle 40a, and DPF 30b and the ozone supplying nozzle 40b, respectively constitute units A and B stored in the metallic casings 31a and 31b respectively. In the present embodiment, the plural units A and B are arranged in parallel with each other.

Figure 2:
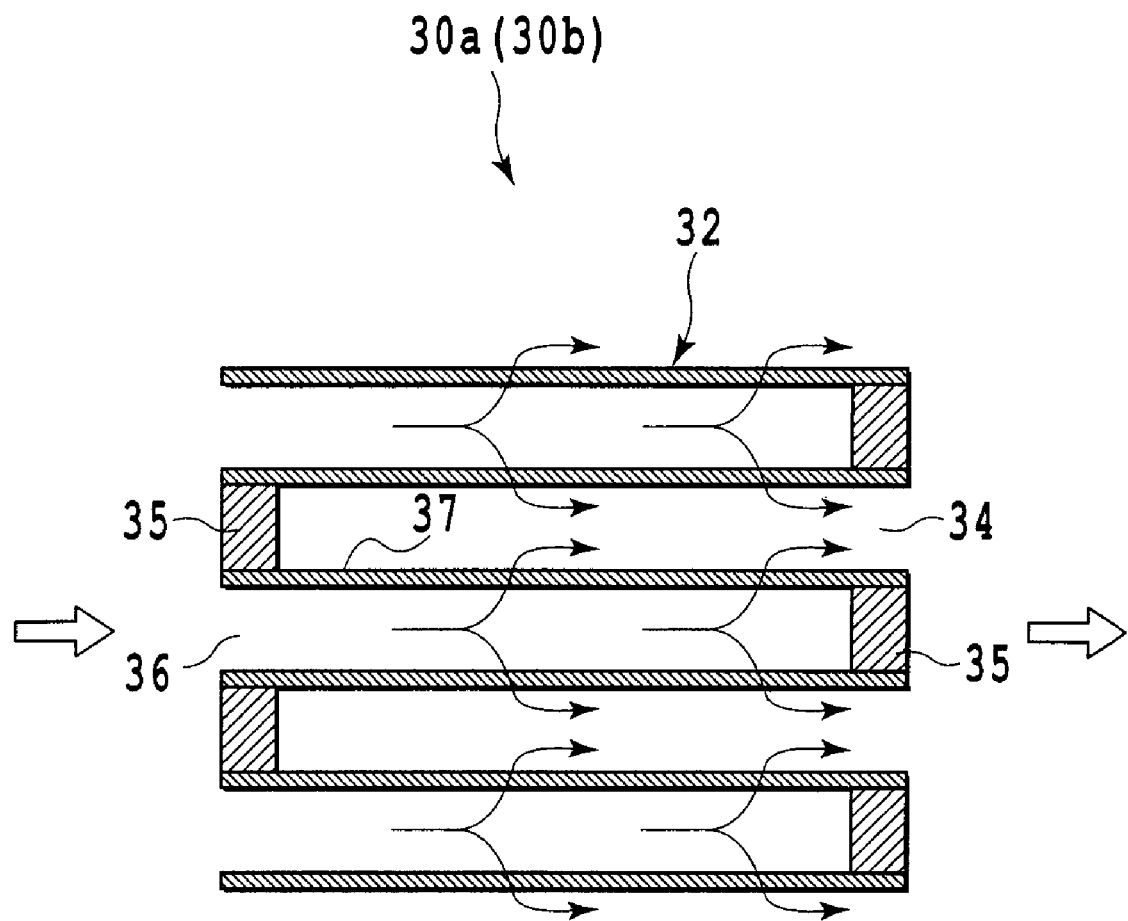
FIG. 2 is a cross section showing a wall-flow type honeycomb structure of DPF.

As shown in FIG. 2, each of DPFs 30a and 30b is equipped with a honeycomb structure body 32 made of porous ceramics, and is a so-called wall flow type. The honeycomb structure body 32 is formed of a ceramic material such as cordierite, silica, and alumina. The exhaust gas flows from the left to the right in the figure as shown in an arrow. The honeycomb structure body 32 includes a first passage 34 and a second passage 36 defined alternately therein to form a honeycomb shape, the first passage 34 being provided with a filling plug 35 at the upstream side thereof and the second passage 36 being provided with a filling plug 35 at the downstream side thereof. Each of the passage 34 and 36 is called a cell and is in parallel to the flow direction of the exhaust gas. When the exhaust gas flows from the left to the right in the figure, the exhaust gas passes from the second passage 36 through a flow passage wall 37 of porous ceramics, enters into the first passage 34, and flows to the downstream side. At this point, PM in the exhaust gas is collected by the porous ceramics to prevent release of PM into the air. A filter type in which the exhaust gas thus passes the flow passage wall and PM is filtered for collection at this point is called a wall flow type.

NOx catalyst 20, as in the case of DPFs 30a and 30b, is supported through support members (not shown) in a substantially cylindrical, metallic casing 21 both ends of which are formed in a frusto-conical shape. The support member has insulation properties, heat resistance, buffer properties and the like and for example, is formed of an alumina mat.

The NOx catalyst 20 is formed preferably of either one of a storage-reduction type NOx catalyst (NSR: NOx Storage Reduction) and a selective reduction type NOx catalyst (SCR: Selective catalytic Reduction).

In a case of using a storage-reduction type NOx catalyst, the NOx catalyst 20 is formed in such a manner that a noble metal such as platinum Pt as a catalyst constituent and a NOx storage constituent are carried on a substrate surface made of an oxidant such as alumina $Al_2O_3$. The NOx storage constituent consists of at least one selected out of, for example, alkali metal such as kalium K, natrium Na, lithium Li or cesium Cs, alkaline earth such as barium Ba or calcium Ca and rare earth such as lanthanum La or yttrium Y.

A storage-reduction type NOx catalyst 20 performs an storage and release function of storbing NOx when an air-fuel ratio of an exhaust gas flowing into the catalyst 20 is leaner than a predetermined value (typically theoretical air-fuel ratio) and releasing the stored NOx when an oxygen density in the exhaust gas is reduced. Since a diesel engine is used in the present embodiment, an exhaust air-fuel ratio is usually lean and the NOx catalyst 20 absorbs NOx in the exhaust gas. In addition, when a reducer is supplied at the upstream side of the NOx catalyst 20 to make an air-fuel ratio of the exhaust gas flowing thereto rich, the NOx catalyst 20 releases the absorbed NOx. This released NOx reacts with the reducer to be reduced and purified.

Figure 3A:
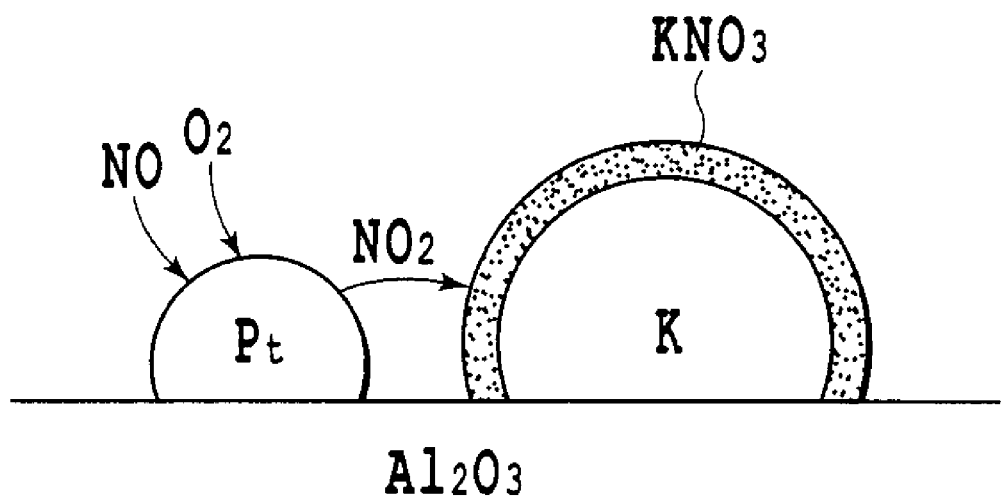
FIG. 3A is a schematic diagram for explaining a mechanism of absorption and release of NOx in a storage-reduction type NOx catalyst.
Figure 3B:
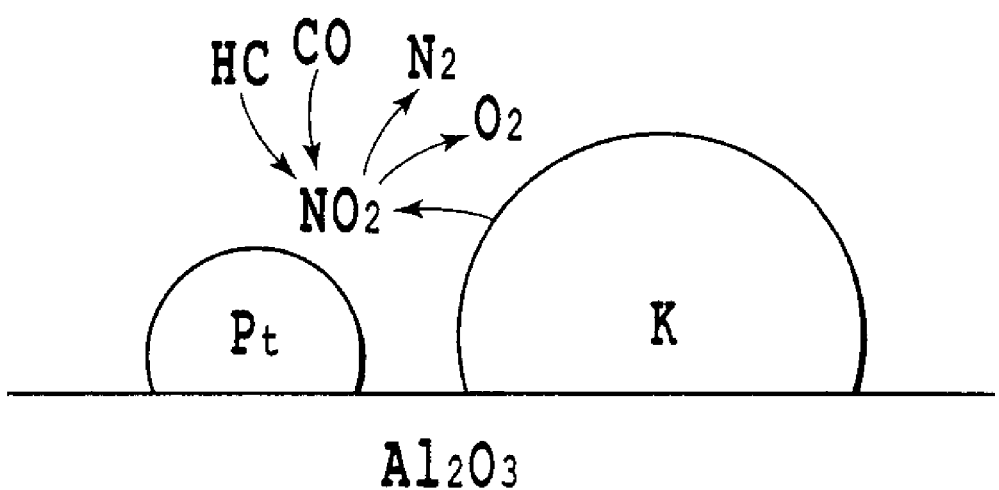
FIG. 3B is a schematic diagram for explaining a mechanism of storage and release of NOx in a storage-reduction type NOx catalyst.

It is considered that storage and release and reduction/purification of the NOx are performed based upon the following mechanism as shown in FIGS. 3A and 3B. This mechanism will be explained with reference to a case of using as an example a storage-reduction type NOx catalyst in which platinum Pt and kalium K are carried on a substrate surface formed of alumina $Al_2O_3$. It should be noted that even in a case of using other noble metals, alkali metal, alkaline earth or rare earth, the same mechanism is to be applied.

First as shown in FIG. 3A, when the flowing exhaust gas becomes lean, the oxygen density and the NOx density in the flowing exhaust gas increase and the oxygen $O_2$ adheres on the surface of platinum Pt in the form of $O_2^-$ or $O_2^-$. On the other hand, NO in the exhaust gas reacts with $O_2^-$ or $O_2^-$ on the surface of platinum Pt to become $NO_2$ ($2NO+O_2 \rightarrow 2NO_2$). Next, the generated $NO_2$ is absorbed by kalium K as an absorption constituent to become in the form of nitrate salt, that is, nitrate kalium $KNO_3$, which is absorbed by K. So long as the oxygen density in the flowing exhaust gas is high, $NO_2$ is generated on the surface of platinum Pt and so long as the NOx absorption capability of K is not saturated, $NO_2$ is to be absorbed into K. In contrast, when the oxygen density in the flowing exhaust gas is reduced to reduce a generation amount of $NO_2$, the reaction advances in the reverse direction ($NO_3 \rightarrow NO_2$) and thus nitrate kalium $KNO_3$ in K is released in the form of $NO_2$ from an absorbent. That is, when the oxygen density in the flowing exhaust gas is reduced, NOx is to be released from K. The degree of leanness in the exhaust gas is lowered, the oxygen density in the flowing exhaust gas is lowered. Accordingly, if the degree of leanness in the flowing exhaust gas is lowered, NOx is to be released from K.

On the other hand, when an air-fuel ratio of the flowing exhaust gas is made rich at this point, HC and CO in the exhaust gas reacts with oxygen $O_2^-$ or $O_2^-$ on platinum Pt to be oxidized. In addition, when an air-fuel ratio of the flowing exhaust gas is made rich, $NO_2$ is released from K, since the oxygen density in the flowing exhaust gas is extremely low. This $NO_2$, as shown in FIG. 3B, reacts with unburned HC and CO through reaction with platinum Pt to produce $N_2$ and $O_2$ as a result of reduction/purification. In this way, when $NO_2$ disappears on the surface of platinum Pt, $NO_2$ is continuously released form K. Accordingly, when an air-fuel ratio in the flowing exhaust gas is made rich, NOx is released from K in a short time to perform reduction/purification.

A reducer used here can be any of those which generate reduction constituent such as carbon hydrogen HC or carbon monoxide CO in the exhaust gas. That is, gaseous bodies such as hydrogen or carbon monoxide, carbon hydrogen of liquid or gaseous body such as propane, propylene, butane or the like and liquid fuel such as gasoline, light oil, kerosene or the like may be used. In the present embodiment, light oil as fuel of a diesel engine is used as a reducer for avoiding complication at the time of storage or resupply. An example method of supplying light oil as a reducer to the NOx catalyst 20 may include a method of injecting light oil from a reducer injection valve separately disposed in the exhaust passage 15 at the upstream side of the NOx catalyst 20 or a method of injecting light oil to the combustion chamber 13 from the fuel injection valve 14 at a late period of an expansion stroke or during an exhaust stroke, that is, performing so-called post injection. It should be noted that supply of a reducer for the purpose of release/reduction of NOx in the NOx catalyst 20 is called "rich spike".

Figure 4:
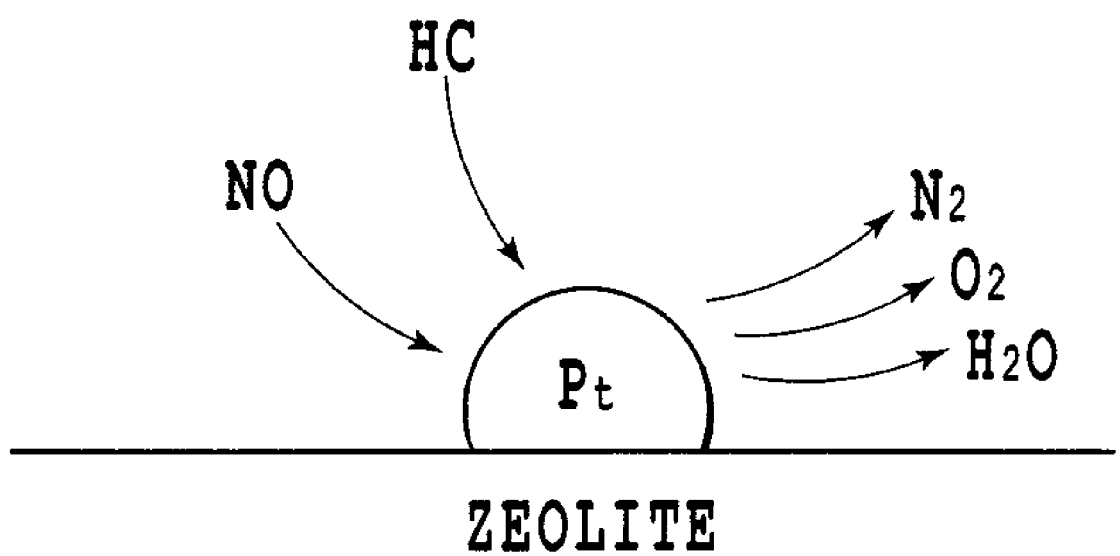
FIG. 4 is a schematic diagram showing a structure of a selective reduction type NOx catalyst.

Next, in a case of using a selective reduction type NOx catalyst, an example of the NOx catalyst 20 may include, as shown in FIG. 4, a catalyst where a noble metal such as platinum Pt is carried on a substrate surface of zeolite, alumina or the like, a catalyst where a transition metal of Cu or the like is carried on the substrate surface by ion exchange, a catalyst where titanium/vanadium catalyst ($V_2O_5$/$WO_3$/$TiO_2$) or the like is carried on the substrate surface. In the selective reduction type NOx catalyst, on condition that an air-fuel ratio in the flowing exhaust gas is lean, HC and CO in the exhaust gas regularly and simultaneously react to produce $N_2$, $CO_2$, and $H_2O$ for purification. However, purification of NOx requires existence of HC. Even if an air-fuel ratio is lean, since unburned HC is necessarily contained in the exhaust gas, it is possible to perform reduction/purification of NOx by using this unburned HC. In addition, as in the case of the absorption reduction type NOx catalyst, the rich spike may be performed to supply a reducer. In this case, in addition to the reducers exemplified in the aforementioned, ammonia or urine may be used.

Back to FIG. 1, the present embodiment is provided with means for detecting a collection amount or degrees of loading of PM in each of DPFs 30a and 30b. That is, exhaust pressure sensors 51a, 52a, 51b and 52b for detecting an exhaust pressure are disposed in the exhaust passage 15 at the upstream side and at the downstream side of each of DPFs 30a and 30b and these sensors are connected to ECU 100 as control means. The ECU 100 determines a collection amount or degrees of loading of PM in each of the DPFs 30a and 30b based upon a deviation or a pressure difference between an upstream-side exhaust pressure detected by each of the upstream-side exhaust sensors 51a and 51b and a downstream-side exhaust pressure detected by each of the downstream-side exhaust pressure sensors 52a and 52b.

It should be noted that in the present embodiment, the upstream-side exhaust sensors 51a and 51b are arranged at the downstream side of the NOx catalyst 20 and at the upstream side of the ozone supplying nozzles 40a and 40b, but may be arranged at the downstream side of the ozone supplying nozzles 40a and 40b. In addition, in the present embodiment, a collection amount or degrees of loading of PM is detected by a pressure difference between the upstream side and the downstream side of each of DPFs 30a and 30b, but a collection amount or degrees of loading of PM may be detected only by one exhaust pressure sensor disposed at the upstream side of each of the DPFs 30a and 30b. Further, degrees of loading may be detected by determining time integration of a soot signal of a soot sensor disposed at the upstream side of the DPF. Likewise, time integration may be performed by evaluating engine characteristic map data stored in ECU in relation to soot generation.

In addition, the present embodiment is provided with means for detecting an air-fuel ratio in the exhaust gas flowing into DPFs 30a and 30b. That is, an air-fuel ratio sensor (not shown) is disposed at the downstream side of the NOx catalyst 20 and also at the upstream side of the DPFs 30a and 30b, and ECU 100 calculates an exhaust air-fuel ratio based upon a detection signal of this air-fuel ratio sensor. In the present embodiment, the air-fuel ratio sensor detects an exhaust air-fuel ratio at the upstream side of the ozone supplying nozzles 40a and 40b. These sensors 51a, 51b, 52a, 52b and 54 all are attached to casings 31a and 31b.

In addition, the exhaust control valve V1 and the ozone control valve V2 are connected to an output side of ECU 100 and are operated by a control output of ECU 100.

Figure 5:
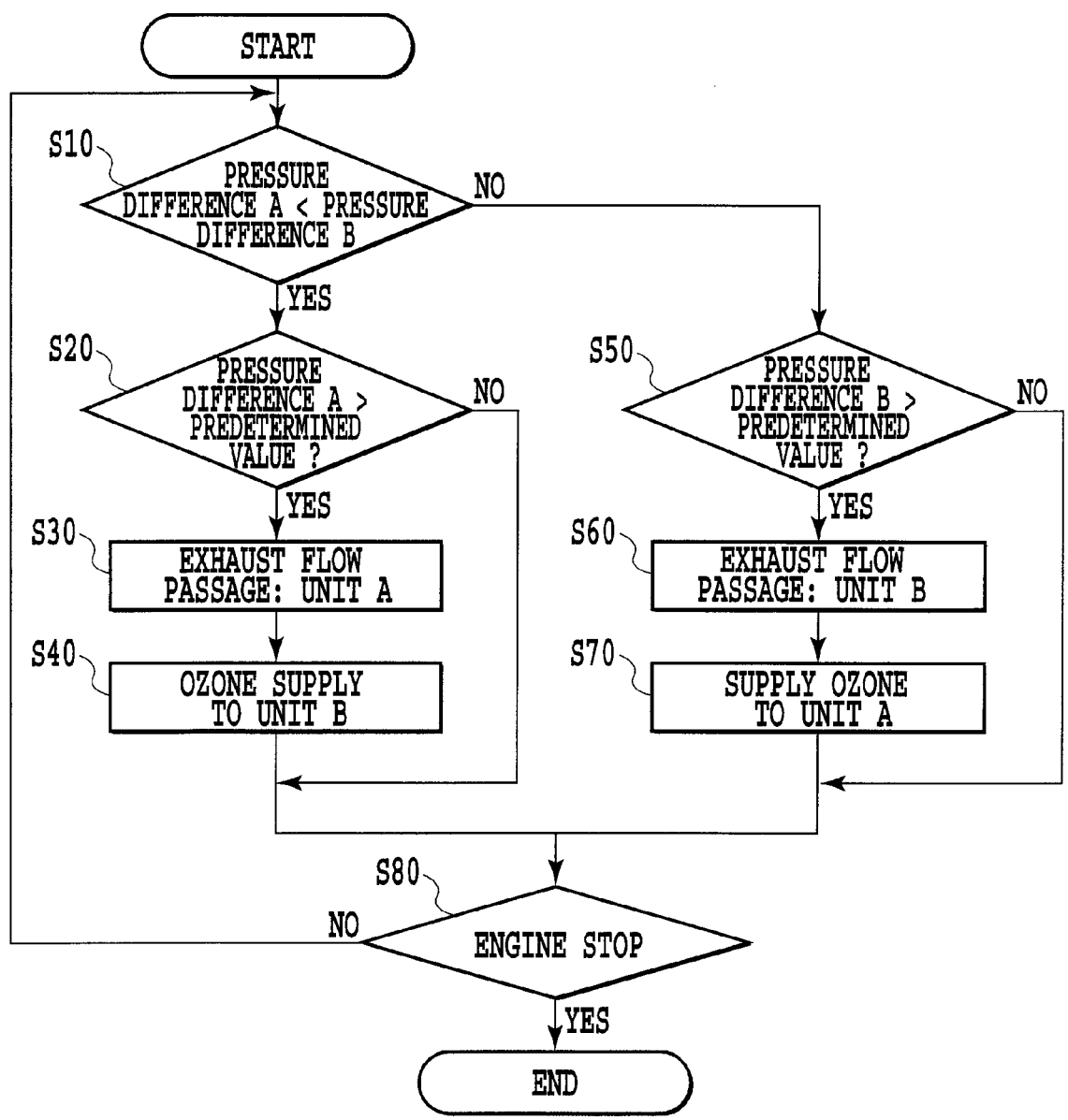
FIG. 5 is a flow diagram showing one example of the processing in ECU of the first embodiment.

One example of an operation of the present embodiment as constructed above will be explained. In FIG. 5, first ECU 100 compares a pressure difference A of DPF 30a with a pressure difference B of DPF 30b (S10). The pressure difference A for DPF 30a is calculated based upon a difference between detection values Pua and Pla (Pua−Pla) of the exhaust pressure sensors 51a and 52a after and before DPF 30a. The pressure difference B for DPF 30b is calculated based upon a difference between detection values Pub and Plb (Pub−Plb) of the exhaust pressure sensors 51b and 52b after and before DPF 30b. It can be considered that as values of the deviations A and B are lager, a collection amount or degrees of loading of PM is larger.

When the pressure difference A<the pressure difference B as a result of comparison at step S10, it can be considered that a collection amount or degrees of loading in the DPF 30b is larger. In this case, next, ECU 100 determines whether or not the pressure difference A exceeds a predetermined reference value (S20). When the answer at step S20 is YES, ECU 100 controls the exhaust control valve V1 and selects a unit A as an object for supplying an exhaust gas (that is, an exhaust passage in the side of the unit A is fully open and an exhaust passage in the side of the unit B is fully closed) (S30).

Next, ECU 100 controls the exhaust control valve V2 and selects a unit B as an object for supplying the ozone (that is, an ozone supply passage 42a in the side of the unit A is fully closed and an ozone supply passage 42b in the side of the unit B is fully open) and also turns on the ozone generator 41 (S40). The supply of the ozone to the DPF 30b in the unit B continues to be performed until the pressure difference A is reduced to less than a predetermined reference value. When the pressure difference A is less than the predetermined reference value, the process at step S40 is skipped.

In addition, when the pressure difference A≧the pressure difference B, it may be considered that a collection amount or degrees of loading in the DPF 30*a* is larger. In this case, next, ECU 100 determines whether or not the pressure difference B exceeds a predetermined reference value (S50). When the answer at step S50 is YES, ECU 100 controls the exhaust control valve V1 and selects a unit B as an object for supplying the exhaust gas (that is, an exhaust passage in the side of the unit A is fully closed and an exhaust passage in the side of the unit B is fully open) (S60).

Next, ECU 100 controls the exhaust control valve V2 and selects the unit A as an object for supplying ozone (that is, an ozone supply passage 42*a* in the side of the unit A is fully open and an ozone supply passage 42*b* in the side of the unit B is fully closed) and also turns on the ozone generator 41 (S70). The supply of ozone to the DPF 30*a* in the unit A continues to be performed until the pressure difference B is reduced to less than a predetermined reference value. When the pressure difference B is less than the predetermined reference value, the process at step S70 is skipped.

The above processing is repeatedly executed while an engine is operating (S80) and ends on condition that the engine stops.

As a result of the above processing, in the present embodiment, supply of ozone is performed to one of DPFs 30*a* and 30*b* which has more collection amount or more degrees of loading of PM, in a state where the supply of the exhaust gas is stopped. At this point, supply of all the exhaust gas is performed to one of DPFs 30*a* and 30*b*, which has smaller collection amount or smaller degrees of loading of PM, while the supply of ozone is not performed thereto.

As described above, the present embodiment can achieve the following effects. That is, since the exhaust control valve V1 is controlled, making it possible to change a ratio of the supply amount of the exhaust gas between the plural DPFs 30*a* and 30*b*, DPF in which a ratio of the supply amount of the exhaust gas is made small can restrict consumption of ozone by a certain substance such as NOx or HC in the exhaust gas and also can restrict decomposition of ozone due to heat of the exhaust gas. Accordingly, ozone is efficiently usable and it is possible to improve a purification efficiency of PM by ozone. It should be noted that here, "a ratio of a supply amount of an exhaust gas is made small" means a state where a ratio of a supply amount of an exhaust gas is made smaller than that of at least one of the other DPFs.

In addition, since the ozone control valve V2 is controlled so that a ratio of a supply amount of ozone to the DPF in which a ratio of a supply amount of the exhaust gas is made relatively small by the exhaust control valve V1 is made relatively large, the consumption of ozone and the decomposition of ozone can be further restricted.

Here, "a ratio of a supply amount of ozone is made relatively large" shows a state where a ratio of a supply amount of ozone is made larger than that of at least one of the other DPFs.

In addition, the exhaust control valve V1 can individually and fully close passages of exhaust gas to plural DPFs 30*a* and 30*b* and the ozone control valve V2 can individually and fully close passages of ozone to plural DPFs 30*a* and 30*b*. Therefore, a desired effect of the present invention can be achieved with a simple structure.

In addition, the present embodiment is further provided with collection amount detecting means for detecting a collection amount of each of the plural DPFs 30*a* and 30*b* and ECU 100 selects DPF which is one of the plural DPFs 30*a* and 30*b*, which has a smaller collection amount of PM as an object for supplying the exhaust gas. In consequence, in relation to DPF where the necessity of oxidation/removal of PM is higher, the oxidation/removal of PM can be performed in preference. Here, "a collection amount is small" shows a state where a collection amount is smaller than that of at least one of the other DPFs.

In addition, only when a collection amount or degree of loading of PM in each of the DPFs 30*a* and 30*b* exceeds a predetermined reference value, the supply of ozone is performed. Therefore, the oxidation and removal of PM can be performed only when the necessity is high, making it possible to save a use amount of ozone.

Next, results of experiments made in relation to the first embodiment are shown below.

(1) Experiment Device

Figure 6:
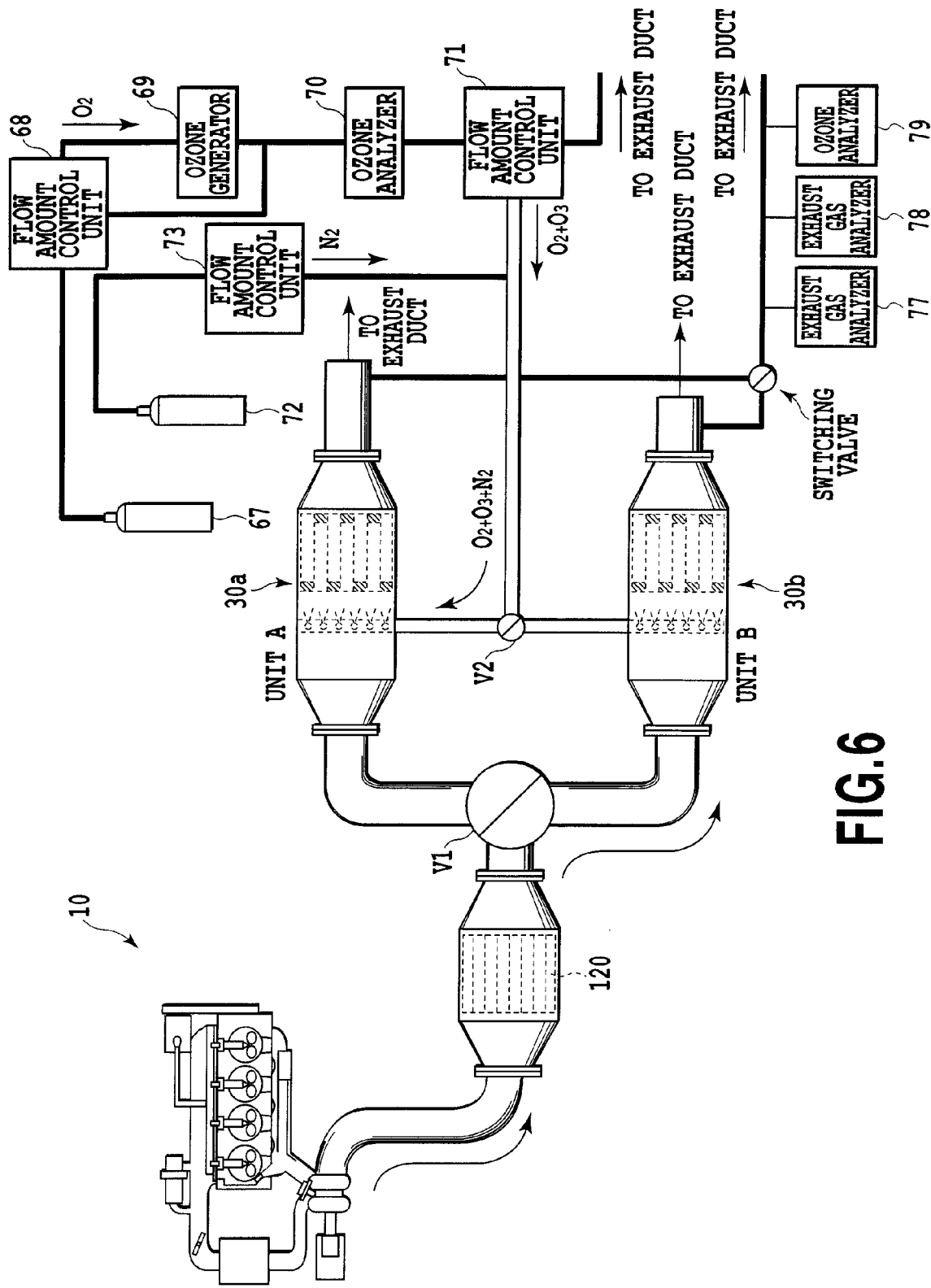
FIG. 6 is a diagram showing an entire experiment device for an experiment performed in relation to the first embodiment.

FIG. 6 shows an outline of the experiment device. A gaseous oxygen $O_2$ supplied from an oxygen bottle 67 is bifurcated by a flow amount control unit 68 and one of the bifurcated gaseous oxygen is supplied to the ozone generator 69. In the ozone generator 69, the oxygen is selectively and partially made ozone $O_3$, and the oxygen and the ozone (or only the oxygen) reaches an ozone analyzer 70. In addition, in the other of the bifurcated gaseous oxygen, the oxygen is controlled in a flow amount and thereafter, is mixed with a gas supplied from the ozone generator 69, which reaches the ozone analyzer 70. In the ozone analyzer 70, the ozone density of the gas flown therein, that is, the ozone density of the supply gas supplied to DPFs 30*a* and 30*b* is measured and thereafter, the supply gas is controlled in a flow amount by a flow amount control unit 71. Nitrogen $N_2$ supplied from a nitrogen bottle 72 is controlled in a flow amount by a flow amount control unit 73, which is supplied to the downstream side of the flow amount control unit 71. The extra supply gas is discharged to an outside from an exhaust duct (not shown) and the supply gas where the flow amount is controlled is supplied via the ozone control valve V2 to DPF 30 or 30*b*.

At the downstream side of DPFs 30*a* and 30*b*, an exhaust gas analyzer 77 for density measurement of HC, CO and NOx, an exhaust gas analyzer 78 for density measurement of CO2 and an ozone analyzer 79 for density measurement of ozone are arranged in series in that order from the upstream side.

(2) Experiment Condition

A diesel engine of 2000 cc displacement was used as an engine 10.

A pre-treatment catalyst 120 was structured in a manner that a Ce—Zr compound oxidant 200 g/L was coated on a cordierite honeycomb structure having a diameter of 103 mm, a length of 155 mm and a cell number of 400 cpsi (cells per square inch) and Pt of 3 wt % was carried to the weight of the Ce—Zr compound oxidant.

A cordierite DPF (catalyst is not coated) having a diameter of 103 mm, a length of 155 mm and a cell number of 300 cpsi was used as each of DPFs 30*a* and 30*b*.

A composition of the supply gas emitted from the ozone generator 69 has ozone $O_3$ of 18700 ppm and $O_2$ as the balance. However, this is the composition in a case where the ozone generator 69 turns on to perform the ozone supply. In a case where the ozone generator 69 turns off and the ozone supply is not performed, the supply gas is only $O_2$. A flow amount of the supply gas is 30 L/min.

(3) Experiment Method

DPF was in advance dried at 150° for two hours and the weight thereof was measured. After the DPF was disposed in the exhaust pipe and the exhaust gas was made to flow therein for 30 minutes, the DPF was taken out of the exhaust pipe and then was dried for two hours and the weight thereof was measured. A difference in the weight was assumed as PM deposit amount. After the exhaust gas was flown for 30 minutes, the PM deposit amount in a case where PM oxidation was not performed was 3.1 g/hL.

In the embodiment and the comparative example, after the exhaust gas was flown therein for 30 minutes, the PM oxidation was made, the DPF was taken out of the exhaust pipe, then was dried for two hours and the weight thereof was measured. The PM deposit amount was obtained by a difference amount from the previously obtained PM deposit amount.

It should be noted that in regard to the embodiment, when an oxidation speed of PM was roughly calculated from a total carbon amount measured with a $CO_2$ meter and a CO meter, the oxidation speed corresponded to the value obtained by measuring the weight of DPF within an error range. In regard to the comparative example, since the $CO_2$ density in the exhaust gas was high (7%), a $CO_2$ amount generated by the PM oxidation could not be separated/measured due to measurement accuracy.

(4) Embodiment and Comparative Example/Embodiment

The exhaust gas was made to be entered into the Unit A from the engine 10 for 30 minutes and PM was made to be deposited. Thereafter, the exhaust control valve V1 was switched to the side of the unit B to prevent the exhaust gas from entering into the unit A. Here the gas ($O_2+O_3$) from the ozone generator 69 was diluted with $N_2$ of 120 L/min, which was added to the unit A and PM was oxidized for 10 minutes.

Comparative Example

The exhaust gas was made to be entered into the Unit A from the engine 10 for 30 minutes and PM was made to be deposited. Thereafter, in a state where the exhaust gas is entering into the unit A, the gas ($O_2+O_3$) from the ozone generator 69 was added to the unit A and PM was oxidized for 10 minutes. The dilution by $N_2$ was not made. The oxidation speed was calculated in consideration of an amount of PM entering into the engine during PM oxidizing.

(5) Experiment Result

Figure 7:
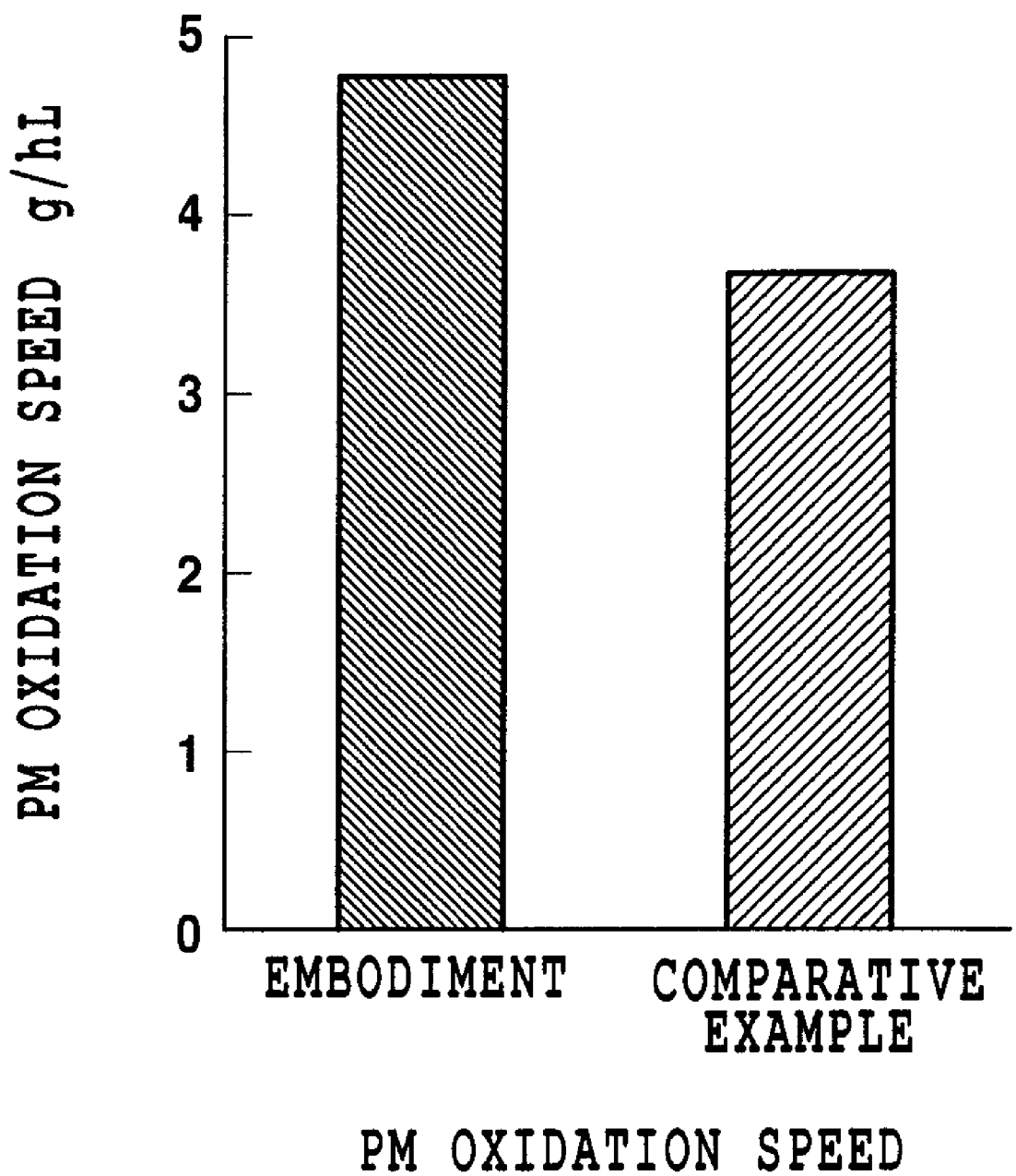
FIG. 7 is a graph showing the experiment result by the experiment device in FIG. 6.

A comparison in PM oxidation speed between the embodiment and the comparative example is shown in FIG. 7. In the figure, a unit g/hL of the PM oxidation speed in the longitudinal axis represents the gram number of PM oxidized per one liter of DPF, as well as per one hour. As shown, there is found out the effect of supply stop of the exhaust gas to the unit A by comparison between the embodiment and the comparative example. That is, in a case of stopping the supply of the exhaust gas to the unit A, the PM oxidation by ozone supply is promoted.

Second Embodiment

Figure 8:
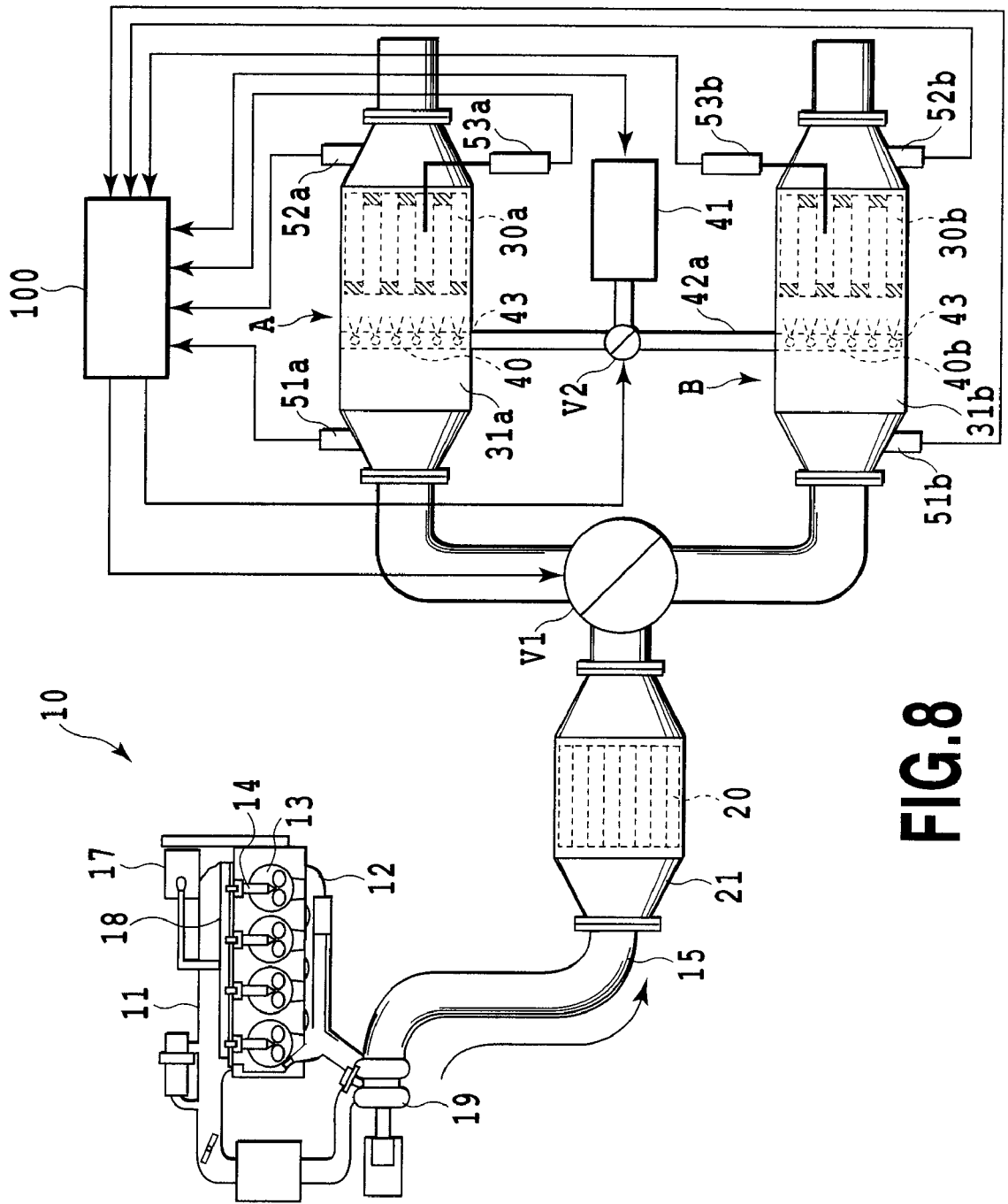
FIG. 8 is a system diagram schematically showing an exhaust purifying system for an internal combustion engine in a second embodiment of the present invention.

Next, a second embodiment of the present invention will be explained with the accompanying drawings. FIG. 8 is a system diagram schematically showing an exhaust purifying system for an internal combustion engine in a second embodiment of the present invention. As illustrated, the second embodiment is provided with means for detecting a DPF floor temperature of each of DPFs 30*a* and 30*b*. That is, the DPFs 30*a* and 30*b* are respectively provided with temperature sensors 53*a* and 53*b* disposed therein and ECU 100 individually calculates the floor temperature of each of DPFs 30*a* and 30*b* based upon detection signals of the temperature sensors 53*a* and 53*b*. A temperature detecting section (in a case of a thermocouple, the tip) of each of the temperature sensors 53*a* and 53*b* is buried inside each of the DPFs 30*a* and 30*b* for detecting the floor temperature of each of DPFs 30*a* and 30*b*, but the temperature detecting section of each of the temperature sensors 53*a* and 53*b* may be disposed near the center of the upstream end surface of each of DPFs 30*a* and 30*b*. It should be noted that since the remaining mechanical arrangement in the second embodiment is similar to that in the first embodiment, it is referred to by identical numerals and the detail explanation is omitted.

Figure 9:
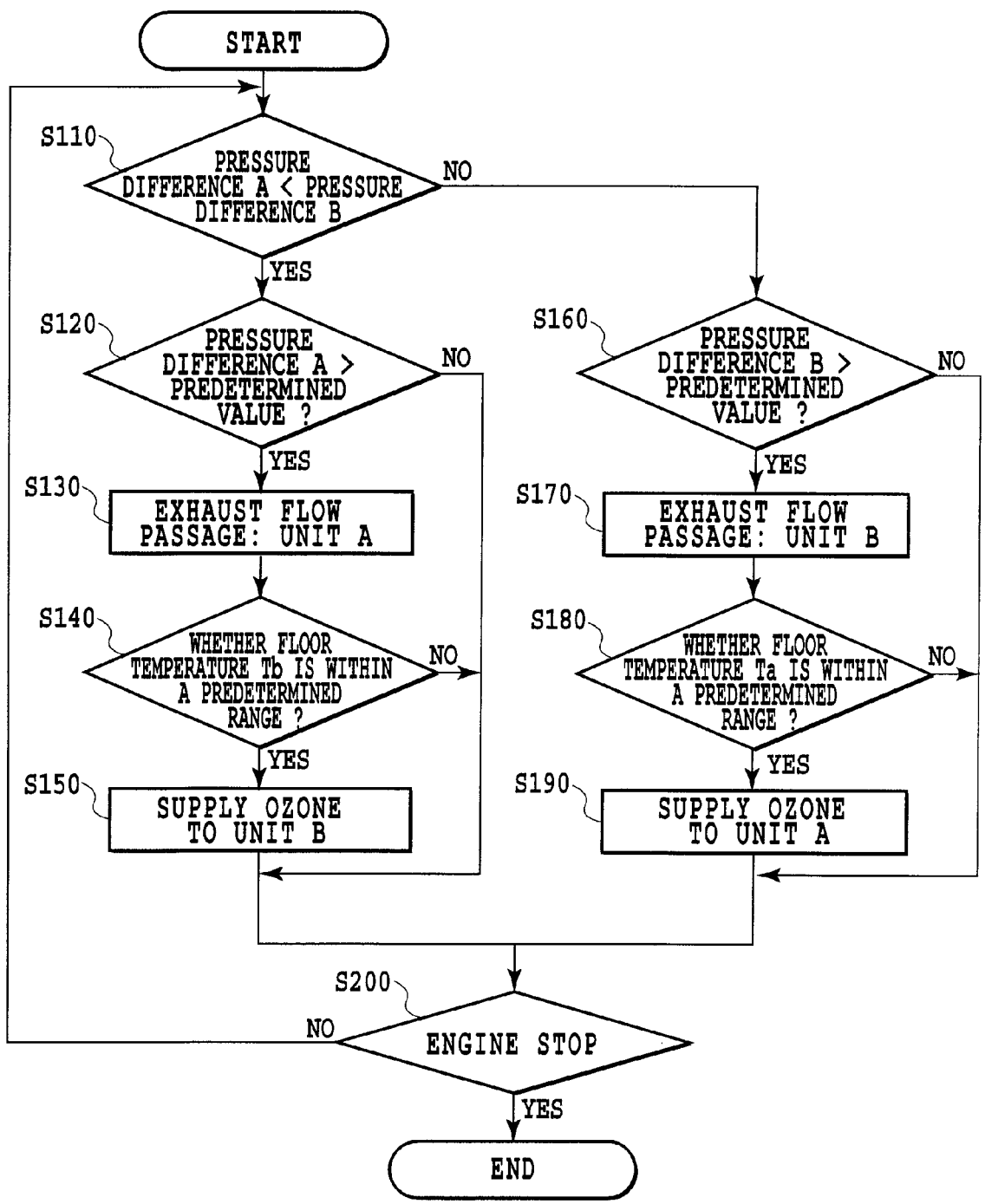
FIG. 9 is a flow diagram showing one example of the process in ECU of the second embodiment.

One example of an operation of the second embodiment as constructed above will be explained. In FIG. 9, first ECU 100 compares a pressure difference A of DPF 30*a* with a pressure difference B of DPF 30*b* (S110). When the pressure difference A<the pressure difference B as a result of comparison at step S110, it may be considered that a collection amount or degrees of loading in the DPF 30*b* is larger. In this case, next, ECU 100 determines whether or not the pressure difference A exceeds a predetermined reference value (S120). When the answer at step S120 is YES, ECU 100 controls the exhaust control valve V1 and selects a unit A as an object for supplying the exhaust gas (that is, an exhaust passage in the side of the unit A is fully open and an exhaust passage in the side of the unit B is fully closed) (S130). The above processing is the same as that of steps S10 to S30 in the first embodiment.

Next, ECU 100 determines whether or not the floor temperature Tb of DPF 30*b* is within an appropriate temperature range, that is, a temperature range for being capable of effectively using the ozone (in a case of a diesel engine, for example a temperature of 150° to 250°) (S140). When the answer at step S140 is YES, ECU 100 controls the ozone control valve V2 and selects a unit B as an object for supplying ozone (that is, an ozone supply passage 42*a* in the side of the unit A is fully closed and an ozone supply passage 42*b* in the side of the unit B is fully open) and also the ozone generator 41 turns on (S150). The supply of ozone to the DPF 30*b* in the unit B continues to be performed until the pressure difference A is reduced to less than a predetermined reference value or the floor temperature Tb is out of an appropriate temperature range. When the answer at step S120 or S140 is NO, the process at step S150 is skipped.

In addition, when the pressure difference A≧the pressure difference B, ECU 100 determines whether or not the pressure difference B exceeds a predetermined reference value (S160). When the answer at step S160 is YES, ECU 100 controls the exhaust control valve V1 and selects the unit B as an object for supplying the exhaust gas (that is, an exhaust passage in the side of the unit A is fully closed and an exhaust passage in the side of the unit B is fully open) (S170).

Next, ECU 100 determines whether or not the floor temperature Ta of DPF 30*a* is within an appropriate temperature range, that is, a temperature range for being capable of effectively using ozone (in a case of a diesel engine, for example a temperature of 150° to 250°) (S180). When the answer at step S180 is YES, ECU 100 controls the ozone control valve V2 and selects the unit A as an object for supplying the ozone (that is, then ozone supply passage 42*a* in the side of the unit A is fully open and the ozone supply passage 42*b* in the side of the unit B is fully closed) and also turns the ozone generator 41 on (S190). The supply of the ozone to the DPF 30*a* in the unit A continues to be performed until the pressure difference B is reduced to less than a predetermined reference value or the floor temperature Ta is out of an appropriate temperature range. When the answer at step S160 or S180 is NO, the process at step S190 is skipped.

The above processes are repeatedly executed while the engine is operating (S200) and ends on condition that the engine stops.

As a result of the above processes, since the second embodiment performs the supply of ozone only when each of the DPF floor temperatures Ta and Tb is within an appropriate temperature range, and ozone is not supplied when it is out of an appropriate range of temperature.

As thus explained, since the second embodiment performs the supply of ozone only when each of the DPF floor temperatures Ta and Tb is within an appropriate temperature range, the oxidation/removal of PM can be performed only in a case suitable therefor to save a use amount of the ozone. In addition, during standby when the floor temperatures Ta and Tb of DPF are not within an appropriate temperature range (S140 and S180), the supply of the exhaust gas to an object DPF is restricted (S130 and S170). Therefore, in a case of a high floor temperature, the temperature reduction or the cooling can be promoted.

Next, results of experiments performed in relation to the second embodiment are shown below.

(1) Experiment Device

The experiment device is the same as that of the first embodiment shown in FIG. 6.

(2) Experiment Condition

It is the same as that of the first embodiment.

(3) Experiment Method

It is the same as that of the first embodiment.

(4) Embodiment and Comparative Example/Embodiment

The Embodiment is the same as the first embodiment to a point that after PM is made to be deposited, exhaust gas is made not to enter into the unit A. In this state, $N_2$ gas was supplied to the unit A and the temperature is adjusted. While a detection value of the temperature sensor disposed at the entrance of DPF (end of the upstream side) was within +5° and −5° centered at a target temperature, the gas ($O_2+O_3$) was added from the ozone generator to oxidize PM. It should be noted that in a case of a temperature of 25° C., the PM oxidation speed was calculated for 10 minutes after starting introduction of $O_3$.

(5) Experiment Result

Figure 10:
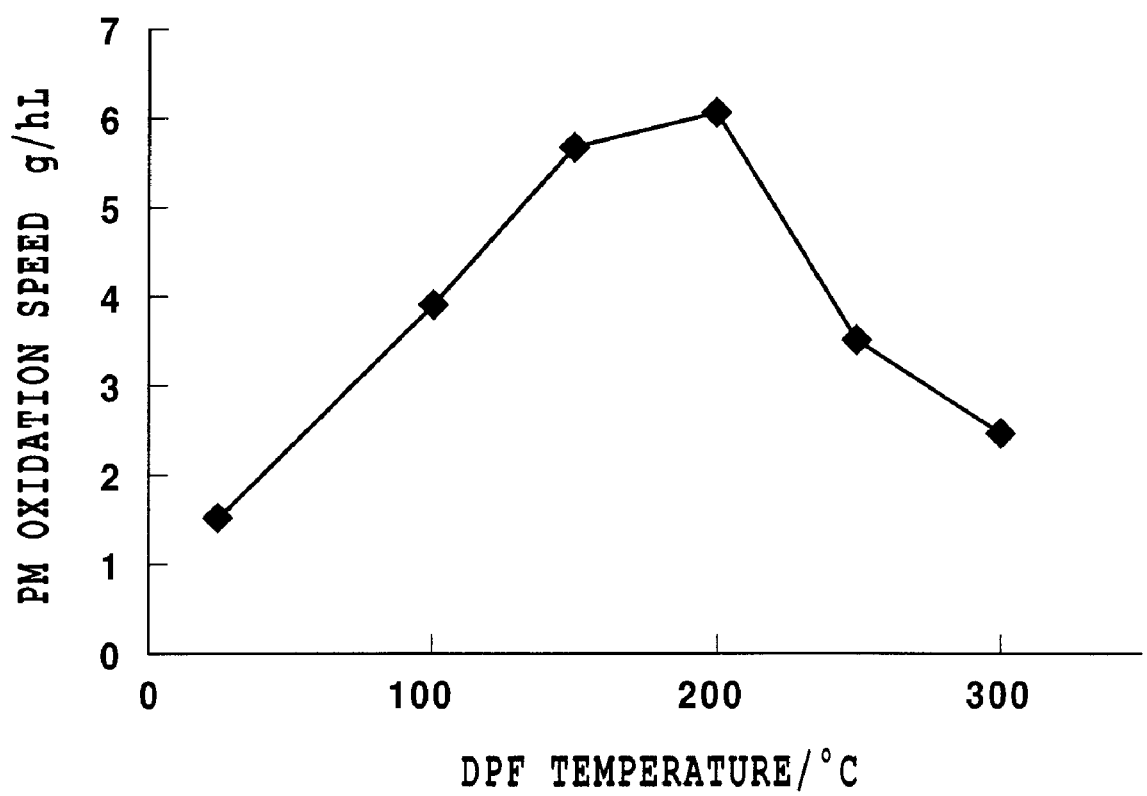
FIG. 10 is a graph showing the experiment result of the experiment performed in relation to the second embodiment.

The PM oxidation speed of the Embodiment is shown in FIG. 10. From FIG. 10, it is understood that an appropriate temperature window exists in a case of oxidizing PM with ozone. That is, in a state of stopping the supply of the exhaust gas to the unit A, by supplying ozone when the DPF floor temperature is in an appropriate temperature, the PM oxidation is promoted.

Third Embodiment

Figure 11:
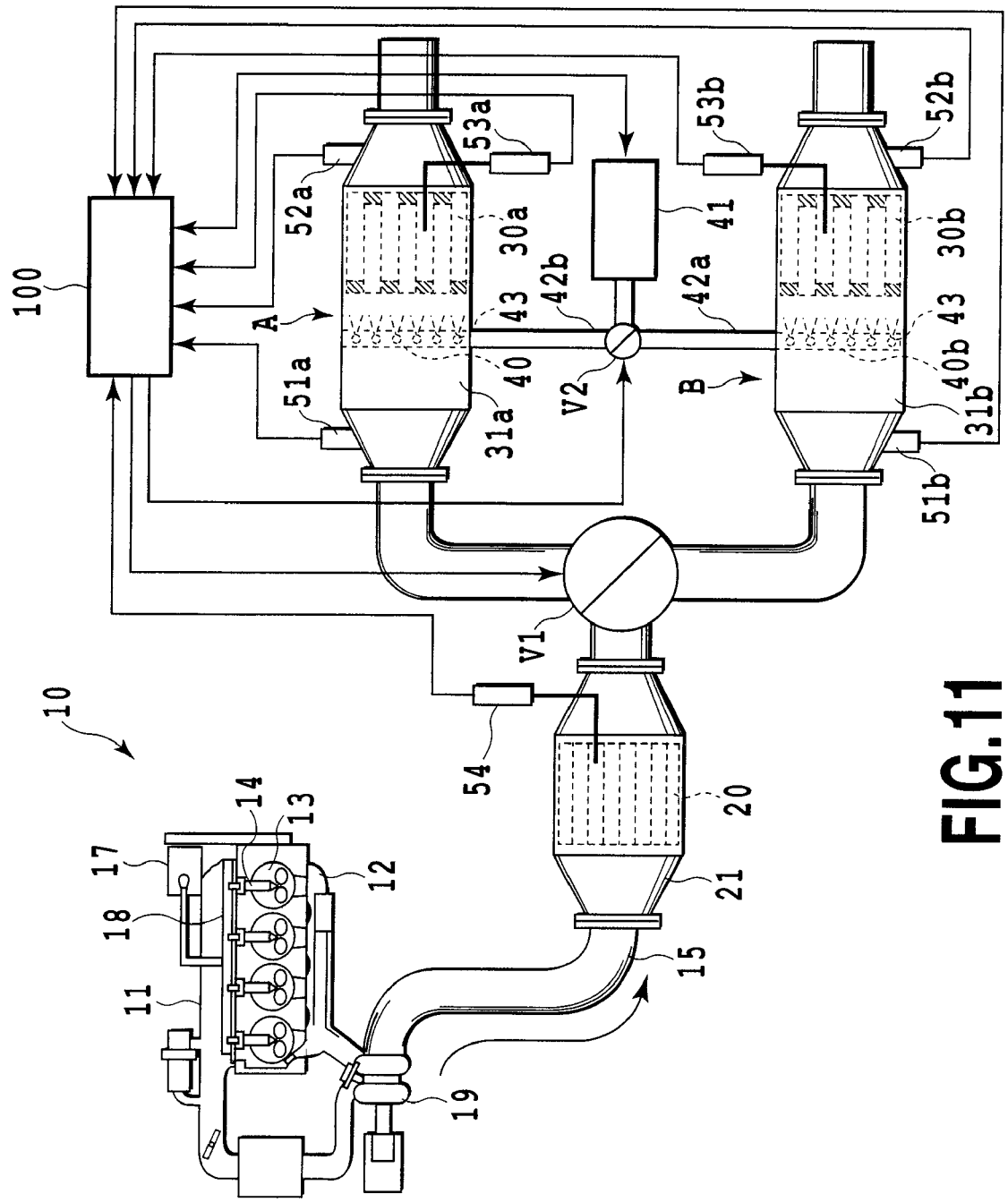
FIG. 11 is a system diagram schematically showing an exhaust purifying system for an internal combustion engine in a third embodiment of the present invention.

Next, the third embodiment of the present invention will be explained with the accompanying drawings. FIG. 11 is a system diagram schematically showing an exhaust purifying system for an internal combustion engine in the third embodiment of the present invention. As illustrated, the third embodiment is provided with means for detecting DPF floor temperature of each of DPFs 30a and 30b. That is, the DPFs 30a and 30b are respectively provided with temperature sensors 53a and 53b disposed therein and ECU 100 individually calculates the floor temperature of each of DPFs 30a and 30b based upon detection signals of the temperature sensors 53a and 53b. A temperature detecting section (in a case of a thermocouple, the tip) of each of the temperature sensors 53a and 53b is buried inside each of the DPFs 30a and 30b for detecting the floor temperature of each of DPFs 30a and 30b, but the temperature detecting section of each of the temperature sensors 53a and 53b may be disposed near the center of the upstream end surface of each of DPFs 30a and 30b.

The NOx catalyst 20 is provided with a temperature sensor 54 disposed therein for detecting a catalyst floor temperature. In addition, a fuel addition injector (not shown) is provided in each of casings 31a and 31b. The fuel addition injector is preferably disposed at as upstream side as possible of each of the casings 31a and 31b and is used for supplying the added fuel toward DPFs 30a and 30b for increasing the temperature. The fuel addition injector is connected to an output side of ECU 100 and is operable by the control output of ECU 100. It should be noted that since the remaining mechanical arrangement in the third embodiment is similar to that in the first embodiment, it is referred to by identical numerals and the detail explanation is omitted.

Figure 12:
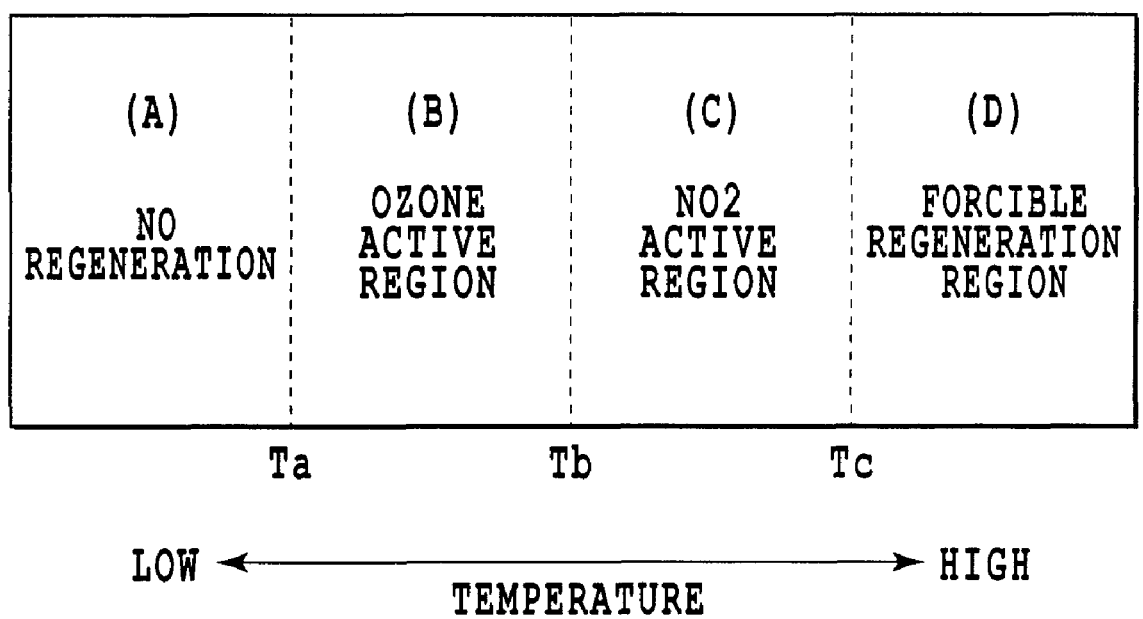
FIG. 12 is a concept diagram showing a setting example of a temperature region in the third embodiment.

As shown in FIG. 12, in the present embodiment, the temperature region is divided into regions of A, B, C and D by reference values Ta, Tb and Tc, and as described later, an optimal PM removal method is selected in accordance with the temperature region of DPF.

Figure 13:
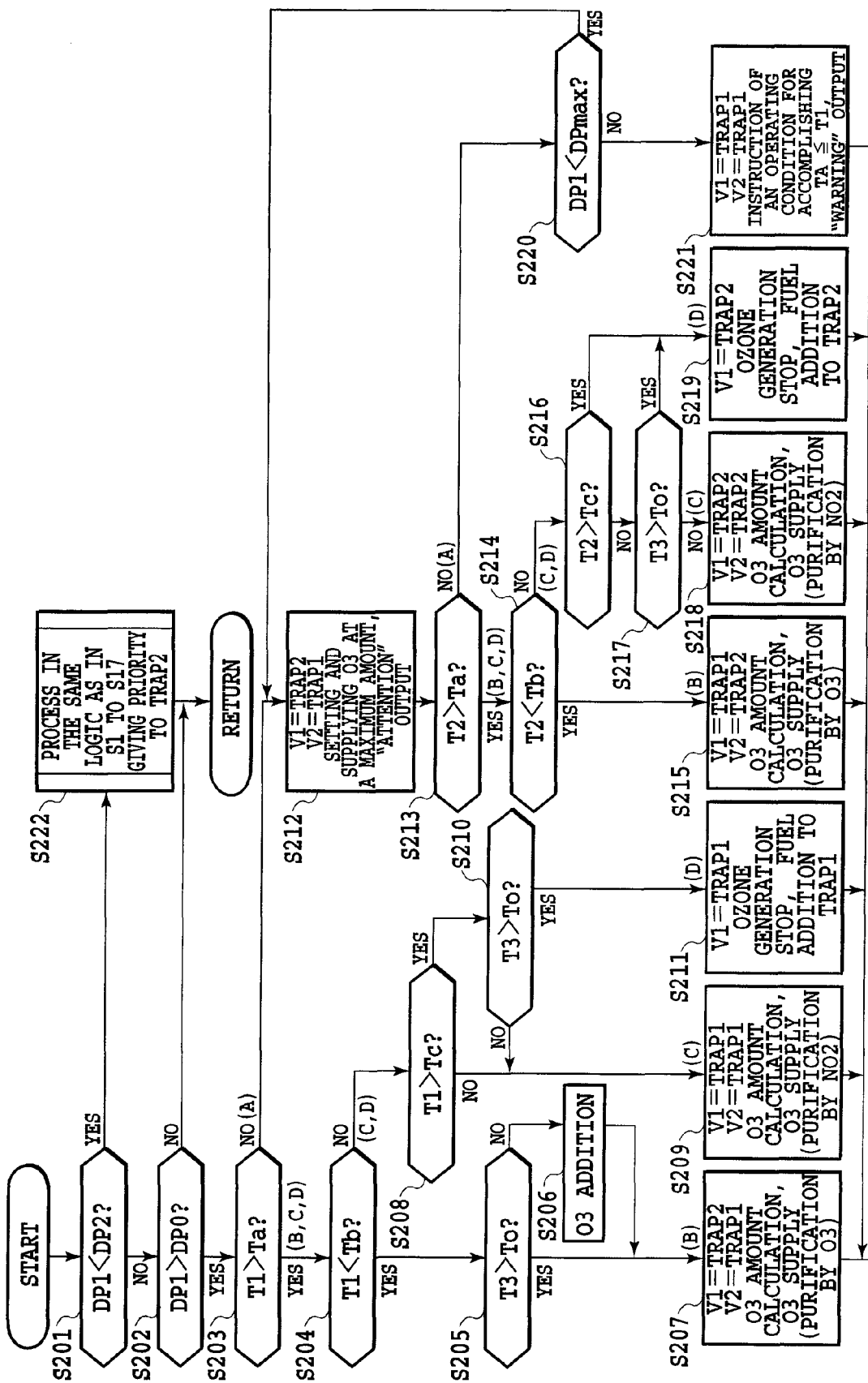
FIG. 13 is a flow diagram showing one example of the process in ECU of the third embodiment.

One example of an operation of the third embodiment as constructed above will be explained. The process routine in FIG. 13 is repeatedly executed at every predetermined time during engine operation. First, ECU 10 compares a pressure difference ΔP1 of DPF 30a with a pressure difference ΔP2 of DPF 30b (S201). The pressure difference ΔP1 for DPF 30a is calculated based upon a difference between detection values Pua and P1a (Pua−P1a) of the exhaust pressure sensors 51a and 52a after and before DPF 30a. The pressure difference ΔP2 for DPF 30b is calculated based upon a difference between detection values Pub and P1b (Pub−P1b) of the exhaust pressure sensors 51b and 52b after and before DPF 30b. It can be considered that as values of the deviations ΔP1 and ΔP2 are larger, a collection amount or degrees of loading of PM is larger.

As a result of the comparison at step S201, when the answer is NO, that is, the pressure difference ΔP1≧the pressure difference ΔP2, DPF 30a having more collection amount of PM is regenerated in preference. In this case, when the temperature of the DPF 30a is low, in addition to the regeneration of the DPF 30a, regeneration of the other DPF 30b is performed (S202 to S221). When the answer at step S201 is YES, that is, the pressure difference ΔP1<the pressure difference ΔP2, the process equivalent to the process switching DPF 30a and DPF 30b in the process at step S202 to S221 (a series of processes where DPF 30b having more collection amount of PM is regenerated in preference and in this case, when the temperature of the DPF 30b is low, in addition to the regeneration of the DPF 30b, regeneration of the other DPF 30a is performed) is performed (S222). Since the content of this series of processes is produced simply by switching DPF 30a and DPF 30b in the process from steps S202 to S221, the detailed explanation is omitted.

As a result of the comparison at step S201, when the answer is NO, that is, the pressure difference $\Delta P1 \geq$ the pressure difference $\Delta P2$, it can be considered that the collection amount or the degree of loading in DPF 30a is larger. In this case, next, ECU 100 determines whether or not the pressure difference $\Delta P1$ exceeds a predetermined reference value $\Delta P0$ (S202). This reference value $\Delta P0$ shows whether or not PM is loaded in DPF to the extent that the DPF requires regeneration and when the pressure difference $\Delta P1$ is below this reference value, it is considered that the regeneration is not required. Accordingly, when the answer at step S202 is NO, the processes are returned.

When the answer at step S202 is YES, ECU 100 determines whether or not a temperature T1 of DPF 30a detected by the temperature sensor 53a exceeds a predetermined reference value Ta (S203). This reference value Ta is a low temperature-side reference value (for example, 100° C.) defined according to whether or not PM can be processed at a speed more than a predetermined value by ozone.

When the answer at step S203 is YES, the temperature of DPF 30a is in a region of B, C or D. Therefore, next, ECU 100 determines whether or not the temperature T1 is below a predetermined reference value Tb (S204). This reference value Tb is a value defined according to which of regeneration of PM by ozone and regeneration of PM by $NO_2$ the temperature is suitable for (for example, 250° C.). When the temperature T1 is below the reference value Tb, the process transfers to step S205, wherein ECU 100 determines whether or not a temperature T3 of the NOx catalyst 20 is larger than a predetermined reference value T0. When the answer at step S205 is YES, the process goes to step S207, wherein ECU 100 selects TRAP2, that is, DPF 30b by the exhaust control valve V1 so that the exhaust gas is supplied to DPF 30b having a smaller degree of loading. In addition, ECU 100 performs selection of TRAP1, that is, DPF 30a by the ozone control valve V2, calculation of an ozone supply amount based upon a predetermined ozone supply map and supply of the calculated supply amount of ozone. Accordingly, ozone is supplied to TRAP1, that is, DPF 30a in a state where the exhaust gas is not supplied thereto.

When the answer at step S205 is NO, that is, when the catalyst temperature is low, an additional amount of ozone is calculated (S206) and this additional amount is to be added to an ozone supply amount calculated at next step S207. Therefore, even when the catalyst temperature is low, NO in the exhaust gas can be efficiently purified.

The ozone supply amount map is a data table produced by associating and storing a relation between an operating condition, i.e. an engine rotational speed and an intake air amount, and a NOx emission amount and a required ozone amount, a relation between ozone and a PM oxidation speed and a relation between $\Delta P$ as a pressure difference between a DPF upstream side and a DPF downstream side and a PM deposit amount. ECU 100 is capable of calculating the required ozone amount by referring to the ozone supply amount map by detection values of an engine rotational speed detected by a crank shaft sensor (not shown) and an intake air amount detected by an air flow meter (not shown).

When the answer at step S204 is NO, that is, the temperature T1 is in the region C or D, ECU 100 then determines whether or not the temperature T1 exceeds a predetermined reference value Tc (S208). This reference value Tc is a high temperature-side reference value defined according to which of regeneration of PM by $NO_2$ and regeneration of PM by a fuel addition to the exhaust passage the temperature is suitable for (for example, 350° C. to 400° C.).

When the temperature T1 is below the reference value Tc, the process transfers to step S209, wherein ECU 100 selects TRAP1 by the exhaust control valve V1 so that the exhaust gas is supplied to DPF 30a having more degree of loading. In addition, ECU 100 performs selection of TRAP1, i.e. DPF 30a, by the ozone control valve V2, calculation of an ozone supply amount based upon a predetermined ozone supply amount map, and supply of the calculated supply amount of ozone. Accordingly, ozone is supplied to TRAP1 (i.e. DPF 30a) in a state where the exhaust gas is supplied thereto. In addition, in a region C in a temperature where the process at step S209 is executed, differently from a case at step S207 (region B), a supply amount of ozone in the ozone supply amount map is set in consideration of a PM purification speed by $NO_2$ generated by reaction between ozone and NO.

When the temperature T1 exceeds the reference value Tc at step S208, the process transfers to step S210, wherein ECU 100 determines whether or not a catalyst temperature T3 is larger than a predetermined reference value T0. When the answer at step S210 is NO, the process goes to step S209 and when the answer at step S210 is YES, the processing goes to step S211, wherein ECU 100 selects TRAP1 by the exhaust control valve V1 so that the exhaust gas is supplied to DPF 30a having more degree of loading. In addition, ECU 100 stops an operation of the ozone generator 41. In addition, calculation of a fuel addition amount based upon a predetermined fuel addition amount map and addition of the calculated amount of fuel are performed. Accordingly, the fuel is added to TRAP1, that is, DPF 30a in a state where the exhaust gas is supplied thereto.

It should be noted that the fuel addition amount map is a data table produced and stored by associating an operating condition, i.e. an engine rotational speed and an intake air amount, with a NOx emission amount and a required fuel addition amount in consideration of $\Delta P$ as a pressure difference between DPF upstream side and DPF downstream side and a temperature T1. ECU 100 is capable of calculating the required fuel addition amount by referring to the fuel addition amount map by detection values of an engine rotational speed and an intake air amount, making it possible to.

When the answer at step S203 is NO, that is, in a case where the temperature T1 is below the reference value Ta and is in a region A, it is possible to assume that it can not be expected that regeneration of DPF 30a is performed at a speed more than a predetermined value. In this case, the process transfers to step S212, wherein ECU 100 selects TRAP2 by the exhaust control valve V1 so that the exhaust gas is supplied to DPF 30b having more degree of loading. In addition, ECU 100 performs selection of TRAP1, that is, DPF 30a by the ozone control valve V2, supply of a predetermined maximum amount of ozone and a warning output of "attention" to a driver (for example, display of character messages in a display (not shown) in a vehicle compartment). Accordingly, ozone is to be supplied to TRAP1, that is, DPF 30a in a state where the exhaust gas is not supplied thereto. The supply of the maximum amount of ozone is continuously performed for a predetermined time, and on condition of an elapse of the predetermined time, the process goes to step S213 and steps after that.

Further, in the following processes, the regeneration treatment of TRAP2 (i.e. DPF 30b having a smaller degree of loading of PM) is performed, or considered.

First, at step S213, ECU 100 determines whether or not a temperature T2 of DPF 30b detected by the temperature sensor 53b exceeds the aforementioned predetermined reference value Ta (S203).

When the answer at step S213 is YES, the temperature of DPF 30b is in the region B, C or D. Therefore, next, ECU 100 determines whether or not the temperature T2 is below the aforementioned predetermined reference value Tb (S214). When the temperature T2 is below the reference value Tb, that is, the temperature T2 is in the region B, the process transfers to step S215, wherein ECU 100 selects TRAP1 by the exhaust control valve V1 so that the exhaust gas is supplied to DPF 30a having a larger degree of loading. In addition, ECU 100 performs selection of TRAP2 (i.e. DPF 30b) by the ozone control valve V2, calculation of an ozone supply amount based upon the aforementioned ozone supply amount map, and supply of the calculated supply amount of ozone. Accordingly, ozone is supplied to TRAP2 (i.e. DPF 30b) in a state where the exhaust gas is not supplied thereto.

When the answer at step S214 is NO, that is, the temperature T2 is in the region C or D, next ECU 100 determines whether or not the temperature T2 exceeds the aforementioned predetermined reference value Tc (S216).

When the temperature T2 is below the reference value Tc, next, ECU 100 determines whether or not the catalyst temperature T3 is larger than a reference value T0. When the answer at step S216 is NO, the process goes to step S218, and when the answer at step S216 is YES, the process goes to step S219. At step S218, ECU 100 selects TRAP2 by the exhaust control valve V1 so that the exhaust gas is supplied to DPF 30b having a smaller degree of loading of PM. In addition, ECU 100 performs selection of TRAP2 (i.e. DPF 30b) by the ozone control valve V2, calculation of an ozone supply amount based upon the aforementioned ozone supply amount map, and supply of the calculated supply amount of ozone. Accordingly, ozone is supplied to TRAP2 (i.e. DPF 30b) in a state where the exhaust gas is supplied thereto. In addition, in a region C of a temperature where the process at step S218 is executed, a supply amount of ozone in the ozone supply amount map is, differently from a case at step S215 (region B), set in consideration of a PM purification speed by $NO_2$ generated by reaction of ozone and NO.

At step S219, ECU 100 selects TRAP2 by the exhaust control valve V1 so that the exhaust gas is supplied to DPF 30b having a smaller degree of loading of PM. In addition, ECU 100 stops an operation of the ozone generator 41. In addition, ECU 100 performs calculation of a fuel addition amount based upon the aforementioned fuel addition amount map and addition of the calculated amount of fuel. Accordingly, the fuel is to be added to TRAP2 (i.e. DPF30b) in a state where the exhaust gas is supplied.

When the answer at step S213 is NO, that is, when the temperature T1 of DPF 30a having a relatively larger degree of loading and the temperature T2 of DPF 30b having a relatively smaller degree of loading are both in an inactive state of being lower than a low temperature-side reference value Ta, it is determined whether or not the former pressure difference ΔP1 is smaller than the upper limit reference value ΔPmax of the pressure difference (S220).

When the answer at step S220 is NO, that is, both of the temperature T1 of DPF 30a and the temperature T2 of DPF 30b are low, and the pressure difference ΔP1 is greater than the upper limit reference value ΔPmax of the pressure difference, the process goes to step S221, wherein the ECU 100 selects TRAP1 by the exhaust control valve V1 so that the exhaust gas is supplied to DPF 30a, and also selects TRAP1 by the ozone control valve V2 so that the ozone is supplied to the DPF 30a. Further, ECU 100 instructs a predetermined temperature-increase operation in such a manner that the temperature T1 exceeds the low temperature-side reference value Ta. This temperature-increase operation includes an engine speed increase request and a rich spike request of an air-fuel ratio to an engine ECU (not shown) for controlling the engine. In addition, ECU 100 performs a warning output of "attention" to a driver (for example, display of character messages in a display (not shown) in a vehicle compartment).

If yes at step S220, that is, both of the temperature T1 of DPF 30a and the temperature T2 of DPF 30b are low and also the pressure difference ΔP1 is smaller than the upper limit reference value ΔPmax of the pressure difference, the process at step S212 is executed again. In consequence, the exhaust gas and the maximum supply amount of ozone are supplied to DPF 30b having a greater degree of loading, thereby promoting purification of PM.

As described above, the present embodiment can achieve the following effects. That is, since the exhaust control valve V1 is controlled, making it possible to change a ratio of the supply amount of the exhaust gas between a plurality of DPFs 30a and 30b, DPF in which a ratio of the supply amount of the exhaust gas is made smaller can restrict consumption of ozone by a certain substance such as NOx or HC in the exhaust gas, and also can restrict decomposition of ozone due to heat of the exhaust gas. Accordingly, the ozone is efficiently usable and it is possible to improve a purification efficiency of PM by ozone.

In addition, since ECU 100 detects a collection amount of PM by the exhaust pressure sensors 51a, 51b, 52a and 52b and controls the exhaust control valve V1 based upon the detected collection amount, the oxidation/removal of PM can be performed in preference in regard to DPF 30a or 30b having the higher necessity of the oxidation/removal of PM, making it possible to perform an appropriate treatment in accordance with the collection amount.

In addition, ECU 100 controls the ozone supply means in accordance with a temperature detected by each of the temperature sensors 53a and 53b and therefore, it is possible to perform an appropriate treatment in accordance with a temperature of each of DPFs 30 and 30b.

In addition, since in the present embodiment, the ozone supply means includes the ozone generator 41 as a single ozone supply source and the ozone control valve, the present invention can obtain a desired effect with a simple arrangement.

In addition, the exhaust control valve V1 can individually and fully closes passages of the exhaust gas to a plurality of DPFs 30a and 30b and the ozone control valve V2 can individually and fully closes passages of the ozone to plural DPFs 30a and 30b. Therefore, the present invention can achieve a desired effect with a simple arrangement.

In addition, since in the present embodiment, ECU 100 changes a combination of DPF selected by the exhaust control valve V1 and DPF selected by the ozone control valve V2 in response to a temperature, it is possible to perform an appropriate treatment in accordance with the temperature.

In addition, in the present embodiment, ECU 100, when a temperature of DPF having a relatively large collection amount out of a plurality of DPFs is below a predetermined low temperature-side reference value Ta, sets an ozone supply amount to the DPF to a predetermined maximum amount and when a temperature of the DPF exceeds the predetermined low temperature-side reference value Ta, sets an ozone supply amount to the DPF based upon a NOx density in the exhaust gas (S212). Therefore, it is possible to perform an appropriate treatment in accordance with the temperature. Here, "a collection amount is relatively large" shows a state where a collection amount is larger than at least one of the other DPFs.

In addition, in the present embodiment, ECU 100, when a temperature of DPF having a relatively large collection amount out of a plurality of DPFs is below a predetermined low temperature-side reference value Ta, selects DPF having a relatively small collection amount as an object for supplying ozone. Therefore, DPF having a relatively high temperature is regenerated in preference, making it possible to effectively use a resource for regeneration of ozone or the like. Here, "a collection amount is relatively large" shows a state where a collection amount is larger than at least one of the other DPFs and "DPF in which a collection amount is relatively small" shows at least one DPF other than DPF in which the collection amount is relatively large.

In addition, in a case where a temperature of DPF exceeds a predetermined high temperature reference value Tc, ECU 100 stops supply of ozone from the ozone supply source (ozone generator 41). Therefore, ozone can be efficiently used by avoiding decomposition of ozone at a high temperature.

In addition, the present embodiment is provided with a fuel addition injector as temperature increasing means at the upstream side of a plurality of DPFs. Since ECU 100 controls the fuel addition injector to increase a temperature of DPF when a temperature of the corresponding DPF selected by the exhaust control valve V1 exceeds a predetermined high temperature reference value Tc, ozone can be efficiently used by avoiding decomposition of ozone at a high temperature. It should be noted that a high temperature reference value as a threshold value on whether to use the temperature increasing means may be a value different from a high temperature value as a threshold value on whether to stop supply of ozone.

It should be noted that the setting of temperature regions and a combination of DPF(s) selected by the exhaust control valve V1 and DPF(s) selected by the ozone control valve V2 are not limited to those of the third embodiment.

In addition, the fuel addition injector is used as the temperature increasing means, but as the temperature increasing means of the present invention, other means such as a heating wire disposed inside or in the outer periphery of DPFs 30a and 30b may be used.

Figure 14:
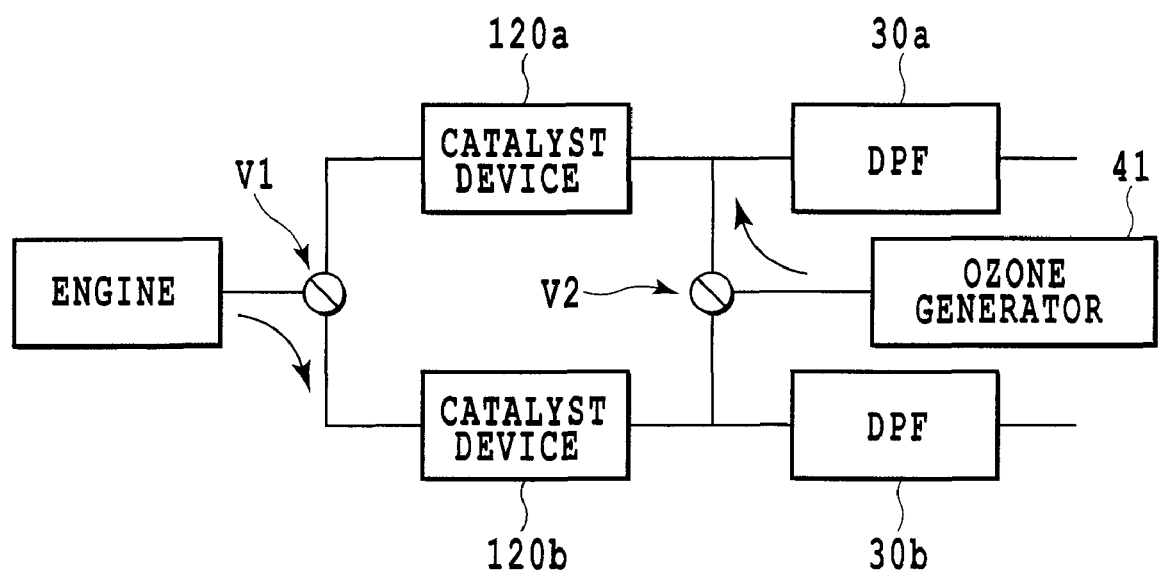
FIG. 14 is a concept diagram showing a modification of the first, second or third embodiment.

It should be noted that in each of the above embodiments, a single catalyst device 20 is provided and the exhaust control valve V1 as a branch point is disposed at the downstream side thereof, but for example, as shown in FIG. 14, in the present invention, a plurality of catalyst devices 120a and 120b may be arranged in parallel with each other and the exhaust control valve V1 as a branch point may be disposed at the upstream side of the catalyst devices 120a and 120b arranged in parallel. In addition, in each of the embodiments, a single type of catalyst is used in the catalyst device 20, but a plurality of types of catalysts may be arranged in series. In addition, three or more sets of units may be provided, the unit being composed of a DPF and an ozone supplying nozzle.

In addition, it is possible to set a condition for performing the PM oxidation that an unnecessary constituent serving for generating reaction with ozone is not contained in the exhaust gas flown into DPFs 30a and 30b. This unnecessary constituent is for example, NOx, and unburned HC also reacts with ozone to produce wasteful consumption of ozone. Whether or not such unnecessary constituent is contained can be estimated from an exhaust air-fuel ratio detected by disposing an air-fuel ratio sensor between the exhaust control valve V1 and the ozone supplying nozzles 40a and 40b. Accordingly, in a case where ECU 100 has determined based upon the detected exhaust air-fuel ratio that the unnecessary constituent is contained, the ozone generator 41 is turned off to stop supply of ozone. On the other hand, in a case where ECU 100 has determined that the unnecessary constituent is not contained, the ozone generator 41 is turned on to perform supply of ozone.

In addition, in each of the above embodiments, an operation of each of the exhaust control valve V1 and the ozone control valve V2 has two states composed of fully open and fully closed states, but instead of such stepped operation change, it is possible to use an exhaust control valve and an ozone control valve which can continuously change a ratio of an emission amount to two directions at the exhaust side.

In addition, in each of the above embodiments, ozone generated by turning on the ozone generator 41 at the time of ozone supply is immediately supplied, but the ozone may be in advance generated and stored to supply the ozone by switching the valve. Further, a pump or a compressor may pressurize and supply ozone. In addition, in each of the embodiments, a single ozone supply source is used, but a plurality of ozone supply sources may be used.

In each of the embodiments, wall flow type DPFs are used as PM collection devices, but besides, various filter structures may be used. For example, a straight flow type filter performing electrostatic collection may be used, in which a direct voltage is applied between a pair of electrodes existing in the exhaust gas to generate discharge, where, for example, PM is charged with minus to absorb the PM with an electrode of a positive side or a negative side by the electrostatic force. Accordingly, the PM collection device is formed as an electrode of a positive side or a negative side. A configuration or structure of a substrate may be, in addition to the aforementioned honeycomb shape, a sheet shape, a tubular shape, a pellet shape, a mesh shape or the like.

Fourth Embodiment

Figure 15:
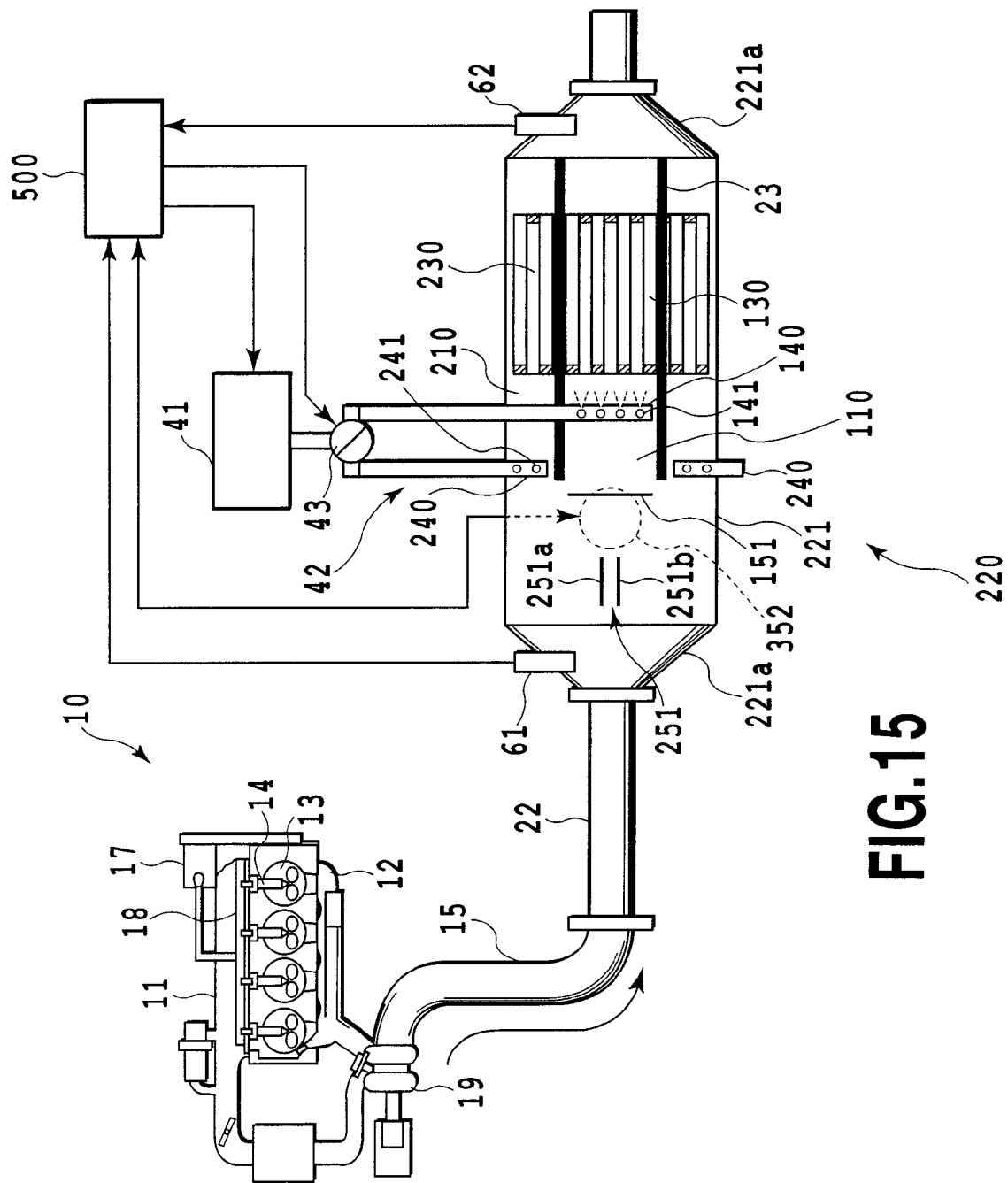
FIG. 15 is a system diagram schematically showing an exhaust purifying system for an internal combustion engine in a fourth embodiment of the present invention.

Next, the fourth embodiment of the present invention will be explained with reference to the accompanying drawings. In FIG. 15, the exhaust passage 15 is provided with a diesel particulate filter (hereinafter, referred to as DPF) 220 as a particulate matter collection device disposed therein for collecting particulate matter (PM) in the exhaust gas. In the figure, DPF 220 is shown in cross section.

DPF 220 is formed of a single metallic casing 221, a plurality of filter chambers 110 and 210 defined inside the casing 221, filter members 130 and 230 disposed in the filter chambers 110 and 210 respectively, ozone supplying nozzles 140 and 240 as ozone supply means disposed in the filter chambers 110 and 210 respectively for supplying ozone ($O_3$) to the filter members 130 and 230 from the upstream side, and valve means disposed at the upstream side of the ozone supplying nozzles 140 and 240 for switching the filter chambers 110 and 210 into which the exhaust gas enters.

The casing 221 is disposed in the midst of an exhaust pipe 22 defining the exhaust passage 15 and has a substantially cylindrical shape extending in the direction of the exhaust gas and each of both the ends 221a is formed in a frusto-conical shape. One filter chamber 110 is disposed in the central portion or the center in the casing 221 and the other filter chamber 210 is disposed in the outer peripheral portion in the casing 221. The filter chambers 110 and 210 are partitioned by a cylindrical partition wall 23 and are configured to form a double-pipe structure as a whole. Hereinafter, the filter chamber 110 in the central portion is called a central filter chamber and the filter chamber 210 in the outer peripheral portion is called an outer peripheral filter chamber. The partition wall 23 is spaced by a predetermined distance from the entrance and the exit of the casing 221. The filter members 130 and 230 are disposed in an axial central portion of the central filter chamber 110 and the outer peripheral filter chamber 210. The ozone supplying nozzles 140 and 240 are provided between the upstream end surface or the front end surface of the filter members 130 and 230, and the upstream end or the front end of the partition wall 23.

The ozone generator 41 as ozone generating means is connected via an ozone supply passage 42 to the ozone supplying nozzles 140 and 240. The ozone supply passage 42 is bifurcated in the half way and a switching valve 43 is disposed at the branch portion. The switching valve 43 is switched in such a manner as to supply the ozone supplied from the ozone generator 41 to either one of the ozone supplying nozzles 140 and 240. The ozone is injected and supplied from supply ports 141 and 241 of the ozone supplying nozzles 140 and 240 toward the filter members 130 and 230 at the downstream side.

The filter members 130 and 230 are supported by support members (not shown) inside the filter chambers 110 and 210. The support member has insulating properties, a heat resistance, buffer properties and the like and is formed of, for example, an alumina mat.

Figure 16:
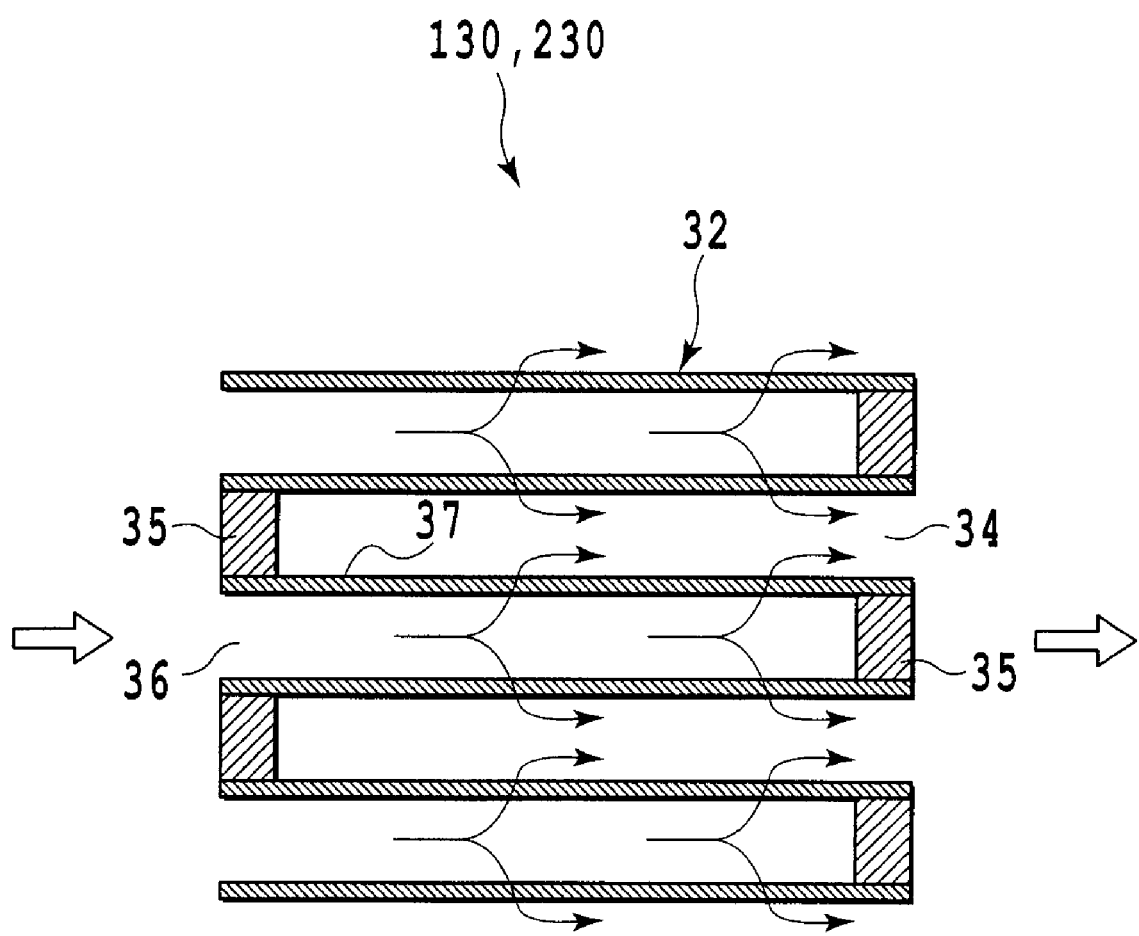
FIG. 16 is a side cross section showing a filter member.

As shown in FIG. 16, each of the filter members 130 and 230 is equipped with a honeycomb structure body 32 made of a porous ceramic, and is of a so-called wall through type. The honeycomb structure body 32 is formed of a ceramic material such as cordierite, silica, and alumina. The exhaust gas flows from the left to the right in the figure as shown in an arrow. The honeycomb structure body 32 includes a first passage 34 and a second passage 36 defined alternately therein to form a honeycomb shape, the first passage 34 being provided with a filling plug 35 at the upstream side thereof and the second passage 36 being provided with a filling plug 35 at the downstream side thereof. Each of the passage 34 and 36 is also called a cell and is in parallel to the flow direction of the exhaust gas. When the exhaust gas flows from the left to the right in the figure, the exhaust gas passes from the second passage 36 through a flow passage wall 37 of a porous ceramic, enters into the first passage 34, and flows to the downstream side. At this point, PM in the exhaust gas is collected by the porous ceramic to prevent release of PM into the air. A filter form in which the exhaust gas thus passes the flow passage wall and PM is filtered for collection at this point is called a wall through type.

An example of the ozone generator 41 may include a generator for generating ozone while flowing dried air or oxygen as a raw material in a discharge tube to which a high voltage can be applied or another arbitrary form thereof. Here, the dried air or oxygen as a raw material, differently from that in Japanese Patent Laid-Open No. 2005-502823, is a gaseous body taken in from an outside of the exhaust passage 15, for example, a gaseous body contained in ambient air and is not air contained in the exhaust gas as in the case of the above document. In the ozone generator 41, a generation efficiency of ozone is higher in a case of using a raw material gaseous body of a low temperature than in a case of using a raw material gaseous body of a high temperature. Accordingly, by thus generating ozone by using the gaseous body outside of the exhaust passage 15, it is possible to improve the generation efficiency of ozone as compared to the case of the above document.

In addition, each of the ozone supplying nozzles 140 and 240 has a plurality of ozone supplying ports 141 and 241 so wide as to cover the entire diameter of the upstream end surface of each of the filter members 130 and 230 so that the ozone can be supplied uniformly on the entire upstream end surface of each of the filter members 130 and 230. The ozone supplying nozzles 140 and 240 are fixed inside the casing 221. It should be noted that the form of the ozone supplying means may have various forms other than the ozone supplying nozzles 140 and 240. For example, in a case of one ozone supplying port 141 only, distances between the ozone supplying port 141 and the upstream end surfaces of the filter members 130 and 230 are preferably made in such a manner that the ozone can spread uniformly over the entire upstream end surface of the filter members 130 and 230.

The valve means is provided with a central valve body 151 (first valve body) and an outer peripheral valve body 251 (second valve body) disposed at inlet ports of the central filter chamber 110 and the outer peripheral filter chamber 210 respectively, wherein the central valve body 151 and the outer peripheral valve body 251 open/close the filter chambers 110 and 210, and further, a drive device 352 as drive means for driving the valve bodies 151 and 251 so that the valve bodies 151 and 251 alternately open and close.

Figure 17:
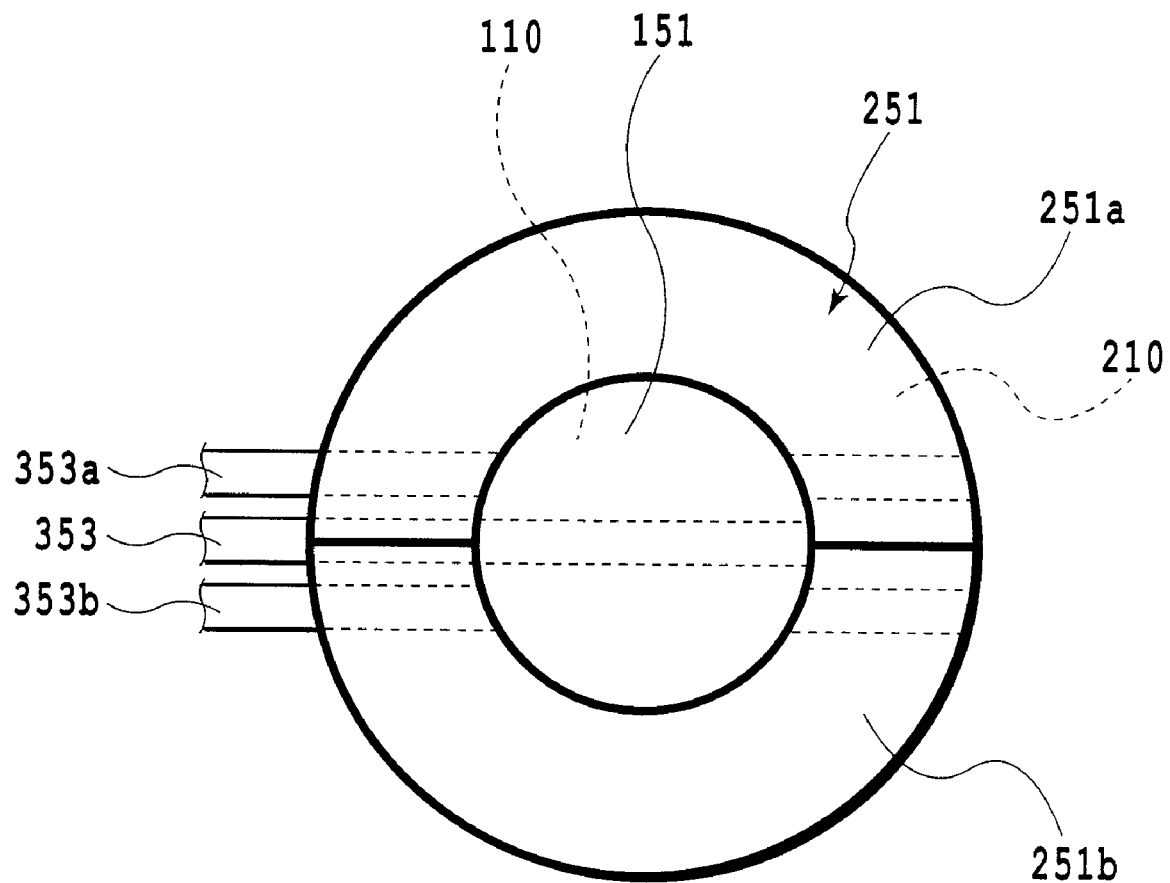
FIG. 17 is a schematic front view showing a central valve body and an outer peripheral valve body.

As shown in FIG. 17, the central valve body 151 is formed in a cylindrical shape so as to correspond to the configuration of the central filter chamber 110 having a circular cross section and on the other hand, the outer peripheral valve body 251 is formed in a circular shape so as to correspond to the configuration of the outer peripheral filter chamber 210 having a circular cross section. The outer peripheral valve body 251 is equally divided into two pieces to form two valve body members 251*a* and 251*b*, and the valve body members 251*a* and 251*b* open/close like a double hinged door or a double casement window.

Figure 18A:
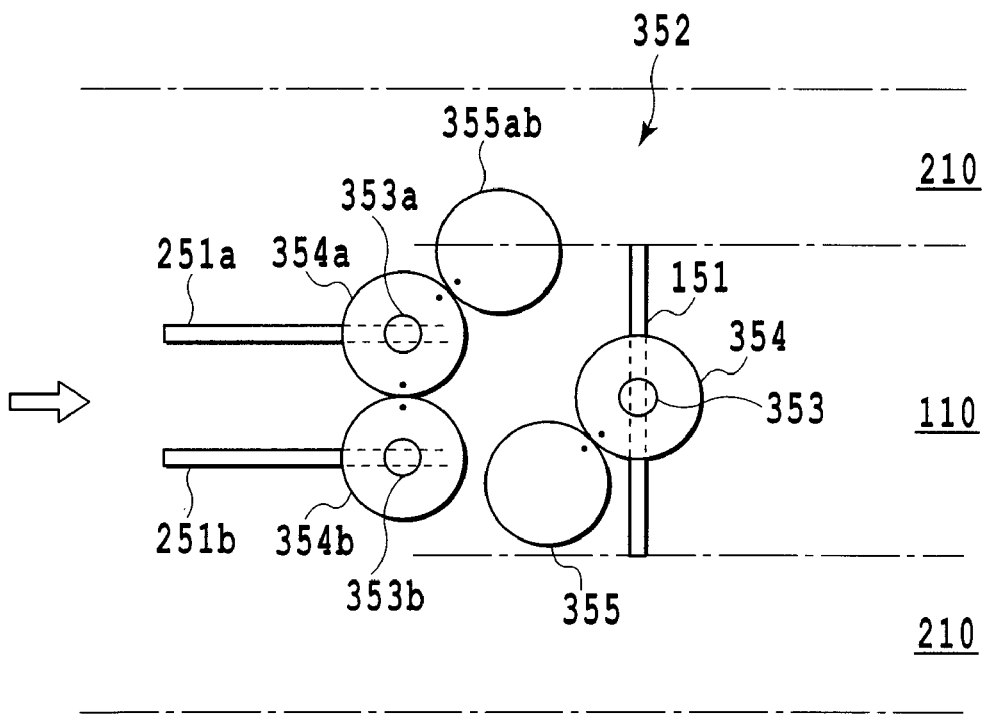
FIG. 18A is a schematic side view showing a drive device.
Figure 18B:
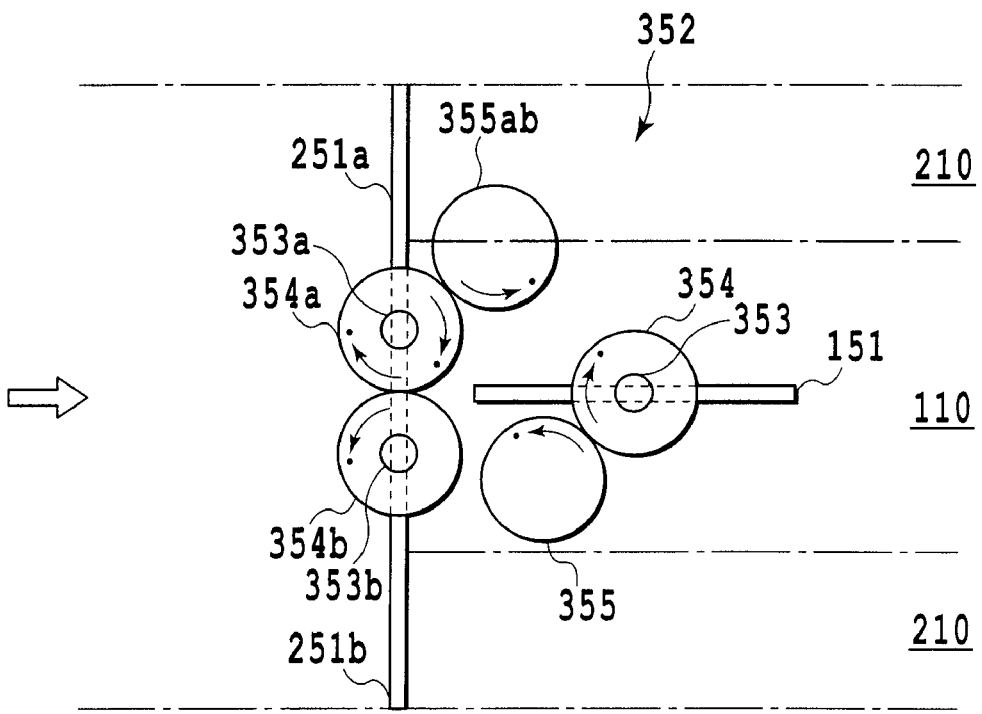
FIG. 18B is a schematic side view showing a drive device.

As shown FIGS. 18A and 18B, the drive device 352 is provided with three rotational shafts 353, 353*a* and 353*b* connected and fixed to the central valve body 151 and the valve body members 251*a* and 251*b* respectively. The rotational shafts 353, 353*a* and 353*b* protrude out of the casing 221 in a state of being horizontally and in parallel with each other at the center in height of the casing 221. The rotational shaft 353 is connected and fixed to the center position in height of the central valve body 151 and the rotational shafts 353*a* and 353*b* are connected and fixed to the lower end and the upper end of the valve body members 251*a* and 251*b* respectively. The center of each of the rotational shafts 353, 353*a* and 353*b* is a rotational center of each of the central valve body 151 and the valve body members 251*a* and 251*b*, and the central valve body 151 and the valve body members 251*a* and 251*b* open/close by rotation of 90° of each of the rotational shafts 353, 353*a* and 353*b*. The central valve body 151 and the rotational shaft 353 are offset in the flow direction of the exhaust gas (arrows in FIGS. 18A and 18B) from the valve body members 251*a* and 251*b* and the rotational shafts 353*a* and 353*b* and in particular, in the present embodiment, are offset to the downstream side.

As shown FIGS. 18A and 18B, driven gears 354, 354*a* and 354*b* having the same number of teeth are attached to the rotational shafts 353, 353*a* and 353*b*. The drive gears 355 and 355*ab* connected to a drive source (not shown) such as a servo motor are in mesh with the driven gear 354 of the central valve body 151 and the driven gear 354*a* of the upper-side valve body member 251*a* respectively. The drive gears 355 and 355*ab* are individually rotated and accordingly, the central valve body 151 and the outer peripheral valve body 251 can be opened/closed independently from each other.

However, the central valve body 151 and the outer peripheral valve body 251 alternately open and close at filter regeneration to be described later. That is, as shown in FIG. 18A, when the central valve body 151 is closed, the valve body members 251*a* and 251*b* of the outer peripheral valve body 251 are open. From this state, the drive source is activated to rotate the drive gears 355 and 355*ab* as shown in FIG. 18B and rotate the driven gears 354, 354a and 354b and the rotational shafts 353, 353a and 353b respectively in the arrow direction by 90°, so that the central valve body 151 is open and the valve body members 251a and 251b of the outer peripheral valve body 251 are closed.

As shown in FIG. 15, drive source of the ozone generator 41, the switching valve 43 and the drive device 352 are connected to an electronic control unit (hereinafter referred to as ECU) 500 as the controlling means and operations thereof are controlled by ECU 500.

In addition, the present embodiment is provided with means for detecting a collection amount or a degree of loading of PM in the filter members 130 and 230. Exhaust pressure sensors 61 and 62 are disposed at the upstream and downstream ends 221a of the casing 221, that is, at the merging portions of the upstream and downstream sides of the filter chambers 110 and 210 for detecting an exhaust pressure therein. ECU 500 determines a collection amount or a degree of loading of PM in the filter members 130 and 230 based upon an exhaust pressure deviation between an upstream-side exhaust pressure and a downstream-side exhaust pressure detected by the exhaust pressure sensors 61 and 62. In the present embodiment, when the exhaust pressure deviation exceeds a predetermined value, ECU 500 determines that the two filter members 130 and 230 both are clogged with PM and then, performs PM removal treatment, that is, filter regeneration treatment of both the filter members 130 and 230 at the same timing. However, an exhaust pressure deviation may be detected for each of the filter members 130 and 230 or of the filter chambers 110 and 210 to individually perform the filter regeneration treatment.

It should be noted that, in the present embodiment, a collection amount or a degree of loading of PM is detected by a pressure difference between the upstream side and the downstream side of each of the filter members 130 and 230, but a collection amount or a degree of loading may be detected only by one exhaust pressure sensor disposed at the upstream side of each of the filter members 130 and 230. Further, the degree of loading may be detected by determining time integration of a soot signal of a soot sensor disposed at the upstream side of the filter member. Likewise, time integration may be performed by evaluating engine characteristic map data stored in ECU in relation to soot generation.

In addition, a NOx catalyst for purifying NOx in the exhaust gas, and/or an oxidation catalyst for purifying unburned constituents such as HC and CO in the exhaust gas or the like may be provided in the exhaust passage 15 at the upstream side of DPF 220. A storage-reduction type NOx catalyst (NSR: NOx Storage Reduction) or a selective reduction type NOx catalyst (SCR: Selective Catalytic Reduction) may be used as a NOx catalyst.

The storage-reduction type NOx catalyst performs a storage and release function of storing NOx when an air-fuel ratio of an exhaust gas flowing into the catalyst 20 is leaner than a predetermined value (typically, theoretical air-fuel ratio) and releasing the stored NOx when an oxygen density in the exhaust gas is reduced. Since a diesel engine is used in the present embodiment, an exhaust air-fuel ratio thereof is usually lean, the NOx catalyst absorbs NOx in the exhaust gas. On the other hand, when a reducer is supplied at the upstream side of the NOx catalyst to make an air-fuel ratio of the exhaust gas flowing thereto rich, the NOx catalyst releases the stored NOx. This released NOx reacts with the reducer to be reduced and purified. A reducer used here can be any of those which generates a reduction constituent such as carbon hydrogen HC or carbon monoxide CO in the exhaust gas. That is, gaseous bodies such as hydrogen or carbon monoxide, carbon hydrogen of liquid or gaseous body such as propane, propylene, butane, or liquid fuel such as gasoline, light oil or kerosene may be used. In a case of a diesel engine, light oil as fuel of the diesel engine is preferably used as a reducer for avoiding complication at the time of storage or resupply. An example method of a reducer supply may include a method of injecting light oil from a reducer injection valve separately disposed in the exhaust passage 15 at the upstream side of the NOx catalyst, or a method of injecting light oil to the combustion chamber 13 from the fuel injection valve 14 at a late period of an expansion stroke or during an exhaust stroke, that is, performing a so-called post injection. It should be noted that supply of a reducer for the purpose of release/reduction of NOx in the NOx catalyst thus is called "rich spike".

In the selective reduction type NOx catalyst, when an air-fuel ratio in the flowing exhaust gas is lean, HC and CO in the exhaust gas regularly and simultaneously react to produce $N_2$, $O_2$, and $H_2O$ for purification. However, purification of NOx requires existence of HC. Even if an air-fuel ratio is lean, since unburned HC is necessarily contained in the exhaust gas, it is possible to perform reduction/purification of NOx by using this unburned HC. In addition, as in the case of the absorption reduction type NOx catalyst, the rich spike may be performed to supply a reducer. In this case, in addition to the reducers exemplified in the aforementioned, ammonia or urine may be used.

The oxidation catalyst is a catalyst which makes unburned constituents such as HC and CO react with $O_2$ to produce CO, $CO_2$, $H_2O$ and the like.

Since the mechanical arrangement of the rest in the fourth embodiment is the same as in the first embodiment, it is referred to as identical numerals and its explanation is omitted.

In the exhaust purifying system of the present embodiment, ozone is supplied from the ozone supplying nozzle 140 at the central side to oxidize (burn) and remove PM deposited in the filter member 130 at the central side, or ozone is supplied from the ozone supplying nozzle 240 at the outer peripheral side to oxidize (burn) and remove PM deposited in the filter member 230 at the outer peripheral side.

Figure 19A:
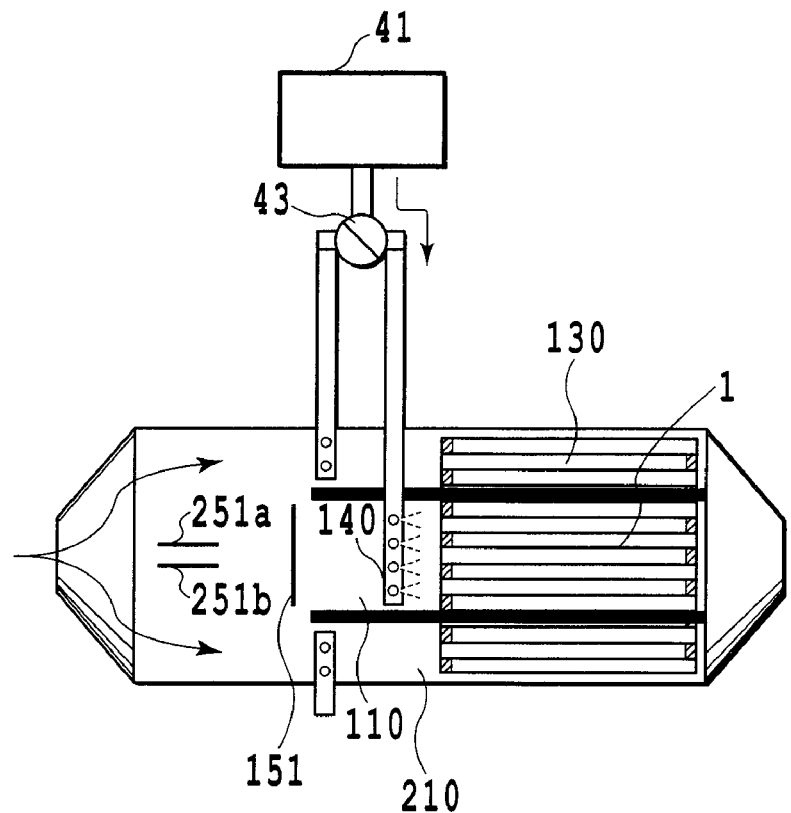
FIG. 19A is a diagram for explaining an operation of an exhaust purifying system of the fourth embodiment.

This event will be in more detail explained. ECU 500, when the exhaust pressure deviation between the upstream-side exhaust pressure and the downstream-side exhaust pressure detected by the exhaust pressure sensors 61 and 62 exceeds a predetermined value, determines that oxidation and removal (i.e. regeneration) of PM deposited in the filter members 130 and 230 is necessary. In addition, the drive source of the drive device 352 is activated to close one of the central valve body 151 and the outer peripheral valve body 251 and open the other. In the present embodiment, regeneration of the filter member 130 at the central side is designed to be performed in preference to the other, that is, as shown in FIG. 19A, the central valve body 151 is closed and the outer peripheral valve body 251 is open. In consequence, flow of the exhaust gas into the central filter chamber 110 is restricted and the exhaust gas substantially passes only the outer peripheral filter chamber 210 and the outer peripheral filter member 230. At this point, collection of PM in the exhaust gas is performed only by the outer peripheral filter member 230.

Next, ECU 500 switches the switching valve 43 for the central side and turns on the ozone generator 41 to supply ozone generated in the ozone generator 41 from the ozone supplying nozzle 140 at the central side. This ozone causes oxidation and removal of PM deposited at the filter member 130 at the central side.

Figure 19B:
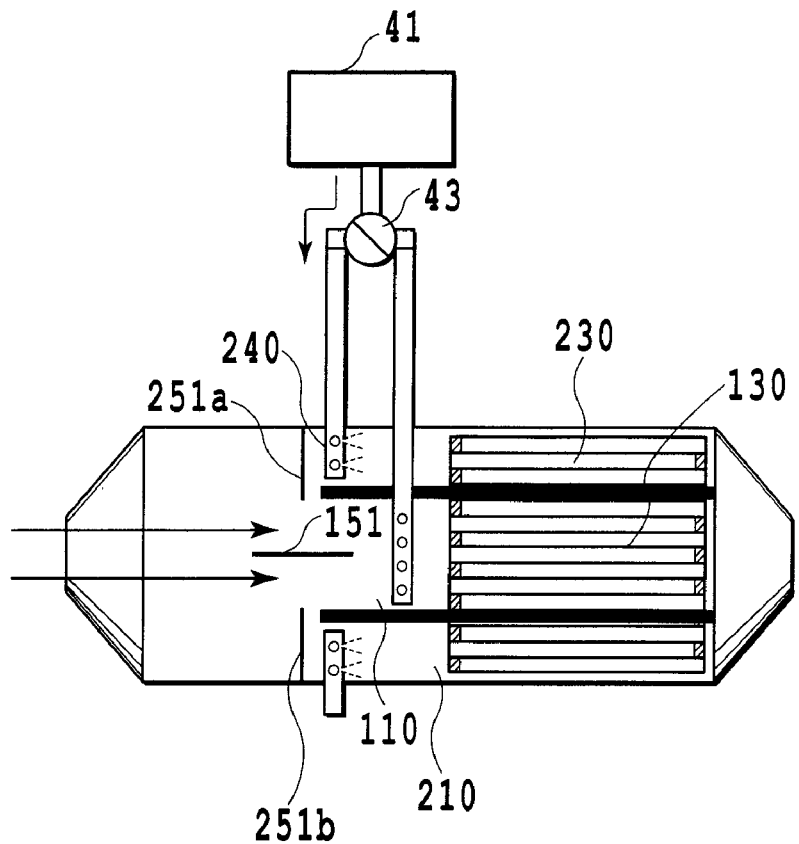
FIG. 19B is a diagram for explaining an operation of an exhaust purifying system of the fourth embodiment.

After a predetermined time has elapsed, as shown in FIG. 19B, the drive source of the drive device 352 is activated to open the central valve body 151 and close the outer peripheral valve body 251. In consequence, flow of the exhaust gas into the outer peripheral filter chamber 210 is restricted and the exhaust gas substantially passes only the central filter chamber 110 and the central filter member 130. Next, ECU 500 switches the switching valve 43 for the outer peripheral side to start supply of ozone from the ozone supplying nozzle 240 at the outer peripheral side, and at the same time stop supply of ozone from the ozone supplying nozzle 140 at the central peripheral side. This supplied ozone causes oxidation and removal of PM deposited at the filter member 230 at the outer peripheral side.

When the predetermined time has elapsed and the regeneration of the outer peripheral filter member 230 at the outer peripheral side has ended, the ozone generator 41 turns off to stop supply of ozone and also, the drive source of the drive device 352 is activated to open the outer peripheral valve body 251. In consequence, flow of the exhaust gas into the outer peripheral filter chamber 210 is to be permitted, so that the exhaust gas substantially passes both the central filter chamber 110 and the outer peripheral filter chamber 210 to collect PM in both the filter members 130 and 230.

In this way, according to the exhaust purifying system of the present embodiment, since the filter chamber at the side where ozone is supplied is closed by the valve means 50, flow of the exhaust gas into the filter chamber is prevented to prevent wasteful consumption of the supplied ozone due to NOx, HC and the like in the exhaust gas. As a result, a greater amount of ozone can be used for oxidation and removal of PM deposited in the filter member. Therefore, it is possible to improve a purification efficiency of PM due to ozone.

Here, a more detailed explanation will be made about reaction and consumption of NOx and ozone. Assuming that ozone $O_3$ and NOx in the exhaust gas, particularly, NO react, the reaction formula is expressed by the following formula.

$$NO+O_3 \rightarrow NO_2+O_2 \quad (1)$$

$NO_2$ generated by this reaction will further react with ozone $O_3$ as the following formula.

$$NO_2+O_3 \rightarrow NO_3+O_2 \quad (2)$$

$NO_3$ generated by this reaction will be decomposed as the following formula by influence of ozone $O_3$.

$$2NO_3 \rightarrow 2NO_2+O_2 \quad (3)$$

Here, in the formula (1), ozone $O_3$ is consumed for oxidation of NO and in the formula (2), ozone $O_3$ is consumed for oxidation of $NO_2$. In the formula (3), $NO_2$ in the right side is $NO_2$ in the left side of the formula (2) and accordingly, ozone $O_3$ is consumed for oxidation of $NO_2$ in the left side of the formula (2).

In this way, NOx and ozone repeat the chain reaction. Therefore, even if ozone is supplied at a position immediately before each of the filter members 130 and 230, when NOx is contained in the exhaust gas at the position, a great deal of ozone is consumed for oxidation and decomposition of NOx to significantly reduce an amount of ozone which can be supplied to the filter members 130 and 230. Since power is required to generate ozone at the ozone generator 41, such wasteful consumption of zone leads to wasteful consumption of power, resulting in the possibility of inviting deterioration of fuel economy.

On the other hand, when ozone is supplied to the exhaust gas atmosphere where HC exists, there occurs a reaction that ozone $O_3$ partially oxidizes HC to generate HC oxidants such as CO, $CO_2$, and $H_2O$. In consequence, an amount of the ozone corresponding to the reaction consumption amount can not be supplied to the filter member, creating the problem as mentioned above.

On the other hand, as in the case of the present embodiment, when the filter chamber at the side where the ozone is supplied is to be closed, flow of the exhaust gas into the filter chamber is prevented to prevent consumption of the supplied ozone for reaction of NO and HC, so that the supplied ozone can be effectively used for oxidation and removal of PM in the filter member. Here, only ozone, a raw material of ozone generation and gaseous bodies (air or the like) used for dilution of ozone substantially result in flowing in the filter chamber at the side where the ozone is supplied.

In addition, as other advantage, since the two filter chambers 110 and 210 are in parallel with each other sandwiching the partition wall 23 therebetween, while regenerating the filter member in one filter chamber, heat of the exhaust gas flowing in the other filter chamber is used to enable to maintain a temperature of the one filter chamber within an appropriate temperature range in which PM oxidation by ozone can be effectively made, resulting in performing PM oxidation by ozone in a relatively high efficiency.

That is, provided that the filter member and the ozone supplying nozzle are disposed in a single casing, even if flow of the exhaust gas is stopped to perform the ozone supply, an inside of the casing is cooled by influence of ozone and atmospheric air while performing the ozone supply, creating the possibility that the temperature in the casing is reduced to a temperature lower than an appropriate temperature range. According to the present embodiment, heat of the exhaust gas flowing in the other filter chamber can be transmitted to the one filter chamber via the partition wall 23 to restrict reduction of a temperature of the one filter chamber, and also maintain the temperature of the one filter chamber within an appropriate temperature range.

Figure 20:
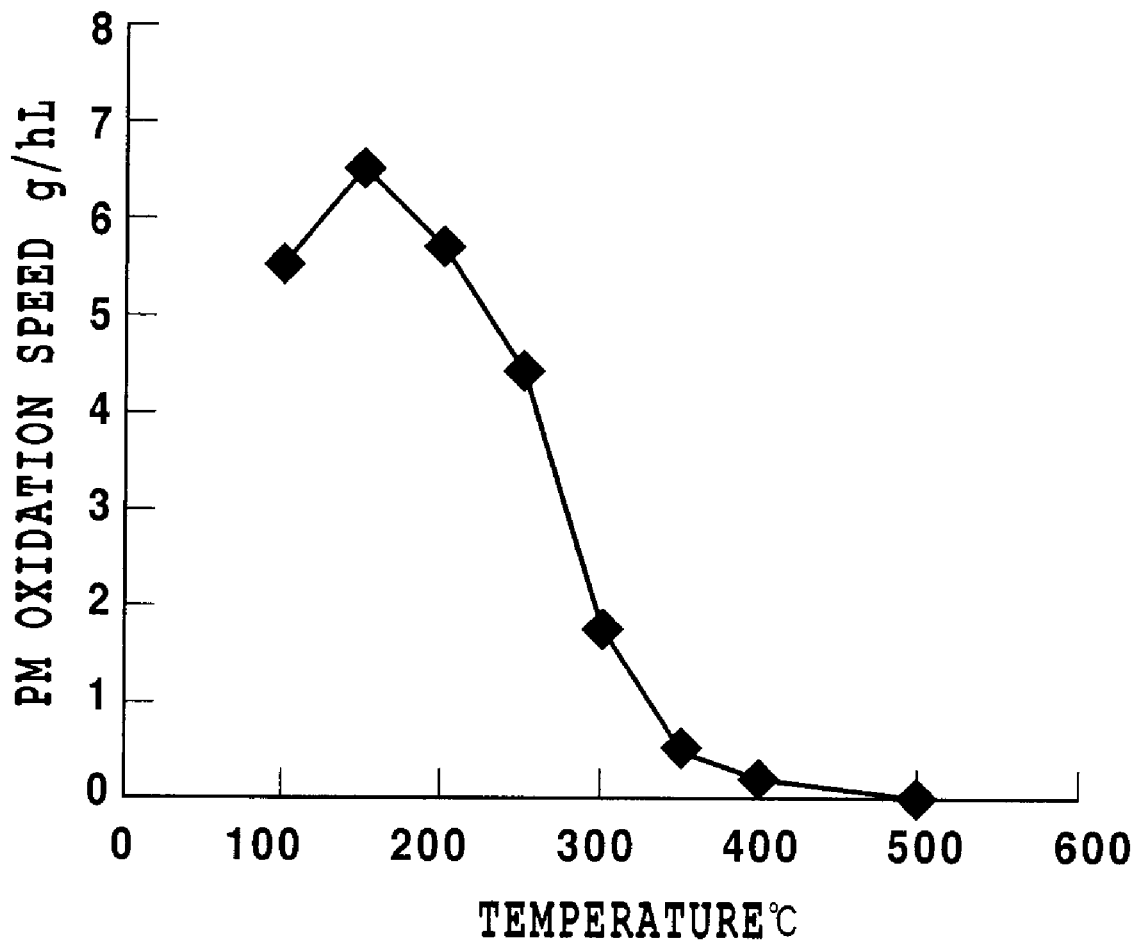
FIG. 20 is a graph showing a relation between a temperature and a PM oxidation speed in a case where PM oxidation is performed by ozone.

FIG. 20 shows a relation between a temperature (lateral axis) of a filter member where ozone is supplied and a PM oxidation speed (longitudinal axis) within a predetermined time. It should be noted that a unit g/hL of a PM oxidation speed in the longitudinal axis shows a gram number of PM oxidized per one liter of a filter member and per one hour. As seen, with an increasing temperature, a PM oxidation speed reaches a peak value in close proximity to 150° once and thereafter, gradually reduces. In addition, when heat decomposition of ozone starts from the neighborhood of 300° and a temperature of the filter member exceeds 350°, a sufficient PM oxidation speed is hard to obtain. From this consequence, it can be said that for effective PM oxidation, a temperature of the filter member or the atmospheric temperature is preferably within 150° to 350° C. In a case of a diesel engine, since the exhaust gas temperature is usually less than 200° to 300° C., it is suitable for maintaining the neighboring filter chamber within an appropriate temperature range proper for PM oxidation. In addition, when the filter chamber at the side where ozone is supplied is closed as in the case of the present embodiment, it can be also prevented that the ozone is decomposed due to heat of the exhaust gas.

Further, one of the advantages of closing the filter chamber at the side where ozone is supplied is that, since a speed of the flow of the gas is low, the contact possibility between ozone and PM is high and the reaction time therebetween is long, making it possible to improve the PM oxidation efficiency.

It should be noted that in the present embodiment, at the time of the ozone supply, the ozone generator 41 is turned on and the generated ozone is quickly supplied, but the ozone may be generated in advance and stored to switch the supply and the stop by a valve. In addition, it is possible to pressurize the ozone by a pump, a compressor or the like for supply.

Next, the experiment for confirming the effect of the fourth embodiment was made and the experiment result is shown below.

(1) Experiment Device

Figure 21:
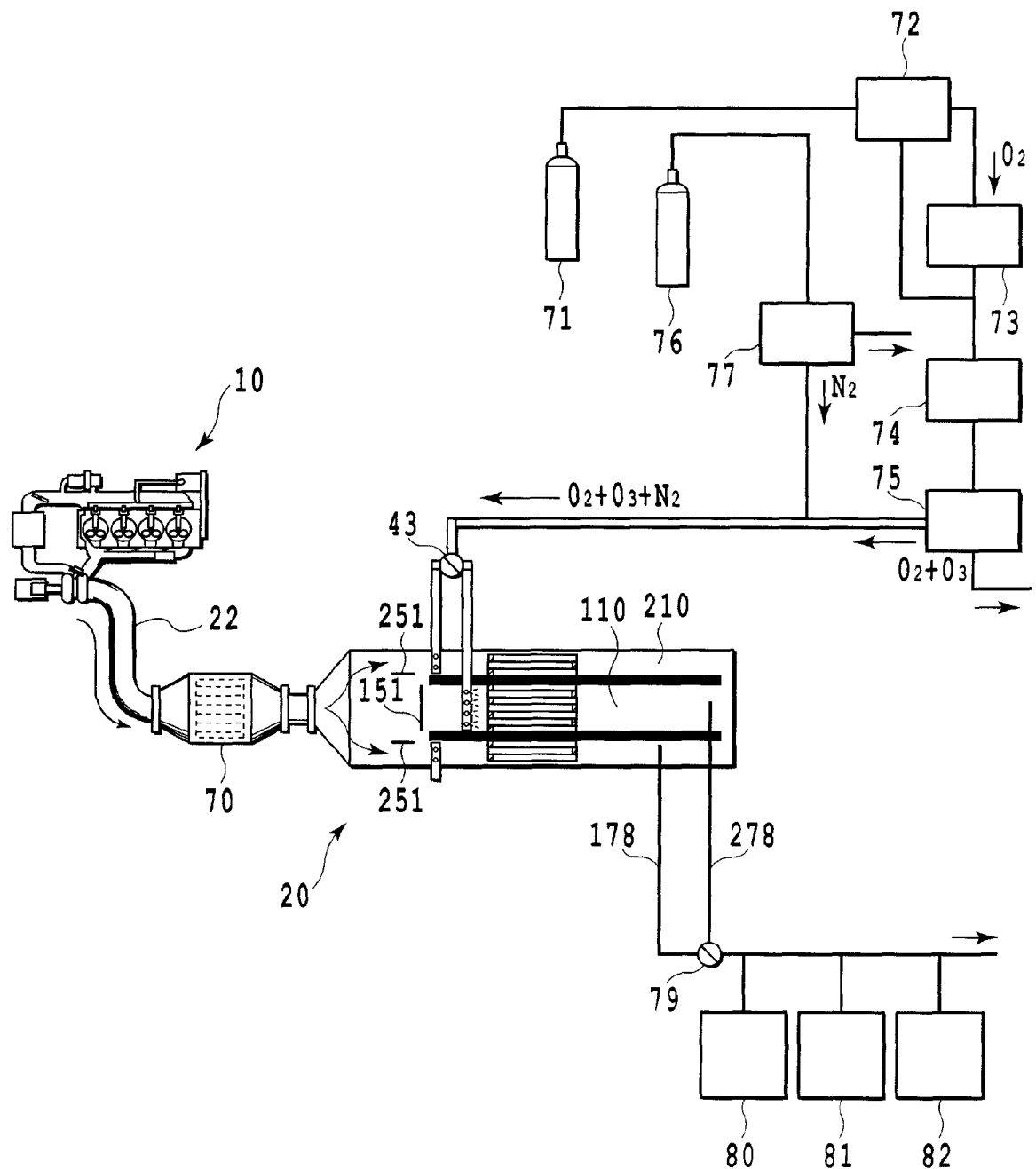
FIG. 21 is a diagram showing an entire experiment device.

FIG. 21 shows an entire experiment device. An exhaust gas emitted from the diesel engine 10 passes the catalyst 70 and DPF 220 in that order via the exhaust pipe 22 and thereafter, is discharged into the air. The catalyst 70 is formed of at least one of the aforementioned NOx catalyst (storage-reduction type or selective reduction type) and an oxidation catalyst. A supply gas as a mixture gas of an ozone gas $O_3$, an oxygen gas $O_2$ and a nitrogen gas $N_2$ is supplied to the switching valve 43.

When the oxygen gas $O_2$ is supplied from the oxygen bottle 71, a flow amount of the oxygen gas $O_2$ supplied to the ozone generator 41 is controlled by a flow amount control unit 72. The remaining oxygen gas bypasses the ozone generator 73. In addition, the ozone density is measured by an ozone analyzer 74 and thereafter, a mixture gas of ozone and oxygen is controlled in flow amount by a flow amount control unit 75 and the extra amount is discharged from an exhaust duct (not shown) to an outside. The mixture gas where the flow amount is controlled is mixed with a nitrogen gas supplied from a nitrogen bottle 76 where the flow amount is controlled by a flow amount control unit 77, and the resulting supply gas is supplied to the switching valve 43.

In DPF 220, extraction pipes 178 and 278 are inserted at exit portions of the central filter chamber 110 and the outer peripheral filter chamber 210 (downstream sides of the filter members 130 and 230) respectively. The extraction pipes 178 and 278 are arranged to be switched by a switching valve 79 to extract a sample of the exhaust gas in one of the central filter chamber 110 and the outer peripheral filter chamber 210. The extracted sample gas is measured and processed by an exhaust analyzer 80 for density measurement of HC, CO and NOx, an exhaust analyzer 81 for density measurement of $CO_2$ and an ozone analyzer 82 for density measurement of ozone disposed in series from the upstream side.

(2) Experiment Condition

A diesel engine of 2000 cc displacement was used as the engine 10. In addition, the engine 10 performed a normal operation at an operating condition of a rotational speed of 2200 rpm and torque of 46 Nm.

In regard to the central filter member 130, there was used a cordierite filter material (not coated with catalyst) of a diameter of 120 mm, a length of 177 mm, a volume of 2 liters and a cell number of 300 cpsi (cells per square inch). An outer peripheral portion of this filter material was machined to reduce the diameter to 60 mm, which was disposed in the central filter chamber 110.

In regard to the outer peripheral filter member 230, there was used a cordierite filter material (not coated with catalyst) of a diameter of 120 mm, a length of 177 mm, a volume of 2 liters and a cell number of 300 cpsi (cells per square inch). This filter material was machined to form a hole at the center having a diameter of 80 mm, which was disposed in the outer peripheral filter chamber 210.

In regard to the catalyst 70, there was used a cordierite honeycomb structure of a diameter of 103 mm, a length of 155 mm, a volume of 1.3 liters and a cell number of 400 cpsi, which was coated with a Ce—Zr compound oxidant 200 g/L (however, L of the denominator means "per a catalyst of one liter") where Pt of 3 wt % was carried to the weight of the Ce—Zr compound oxidant. Here, if the catalyst 70 is not used, an unburned HC amount increases and ozone reacts with this HC, which affects the PM oxidation speed. Therefore, the catalyst 70 was disposed.

In regard to an ozone addition amount, a mixture gas of ozone emitted from the flow amount control unit 75 and an oxygen has an ozone density of 18700 ppm, and the remaining portion has an oxygen gas having a flow amount of 30 L/min, and a nitrogen gas having a flow amount of 120 L/min is added to the above to form a diluted gas, that is, the supply gas, which is supplied to the switching valve 43.

(3) Method of Calculating PM Oxidation Speeds

The PM oxidation speed was approximately calculated from a total carbon amount measured by the exhaust gas analyzers 80 and 81.

(4) Embodiment and Comparative Example

Embodiment 1

The outer peripheral valve body 251 is closed and the central valve body 151 is open to flow the exhaust gas from the engine only into the central filter chamber 110. This state is kept for 30 minutes. For this duration, PM is deposited in the central filter member 130. Thereafter, the outer peripheral valve body 251 is open and the central valve body 151 is closed to switch the filter chamber where the exhaust gas from the engine flows for the outer peripheral filter chamber 210 and supply the supply gas containing ozone to the central filter chamber 110, thereby oxidizing PM deposited in the central filter member 130 for 10 minutes.

On the other hand, the reverse operation to the above is made. The central valve body 151 is closed and the outer peripheral valve body 251 is open to flow the exhaust gas from the engine only into the outer peripheral filter chamber 210. This state is kept for 30 minutes. For this duration, PM is deposited in the outer peripheral filter member 230. Thereafter, the central valve body 151 is open and the outer peripheral valve body 251 is closed to switch the filter chamber switch the exhaust gas from the engine to flow to the central filter chamber 110, and supply the supply gas containing ozone to the outer peripheral filter chamber 210, thereby oxidizing PM deposited in the outer peripheral filter member 230 for 10 minutes.

Comparative Example 1

Figure 22:
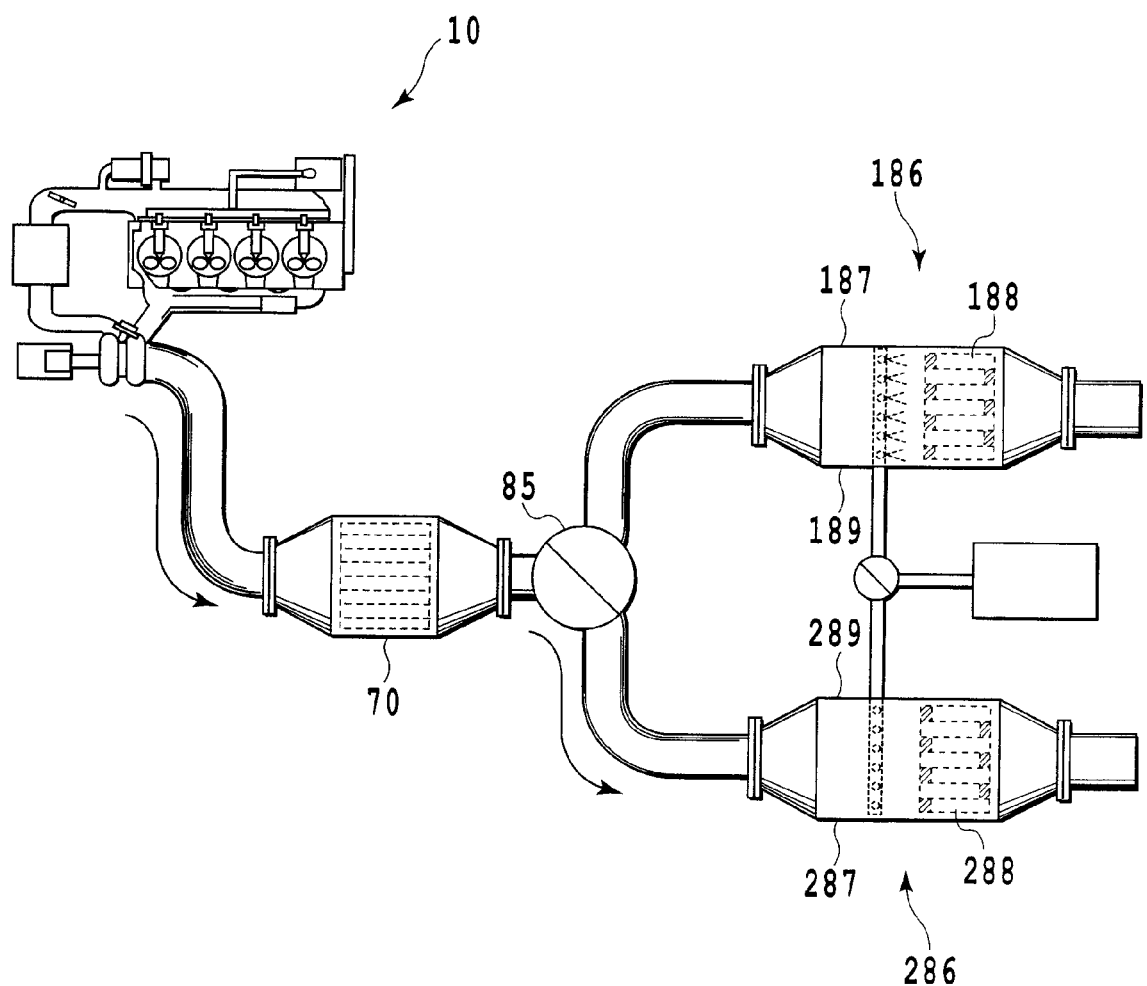
FIG. 22 is a diagram showing an arrangement of Comparative Example 1.

For ascertaining the effect of the present embodiment that one filter chamber where the ozone is supplied is kept warm with heat of the exhaust gas flowing in the other filter chamber, a comparative example as shown in FIG. 22 was used. It should be noted that components identical to those in the present embodiment are referred to as identical numerals and the detailed explanation is omitted.

In this comparative example, an exhaust passage is bifurcated via a switching valve 85 at the downstream side of the catalyst 70 and the exhaust passages are individually provided with DPFs 186 and 286. Accordingly, casings 187 and 287 are separately disposed. Filter members 188 and 288 and ozone supplying nozzles 189 and 289 are provided in the casings 187 and 287 respectively. The switching valve 85 switches for one exhaust passage at the side of DPF 186 or for the other exhaust passage at the side of DPF 286. In this arrangement, an inside of one casing can not be kept warm with heat of the exhaust gas flowing in the other casing at regeneration of the one DPF.

In this case, the switching valve 85 is switched for one exhaust passage at the side of DPF 186 and the exhaust gas is made to flow into DPF 186 for 30 minutes to collect PM. Thereafter, the switching valve 85 is switched for the other exhaust passage at the side of DPF 286 to prevent the exhaust gas from flowing in DPF 186 and supply the supply gas from the ozone supplying nozzle 189 therein, oxidizing PM deposited in the one filter member 188 for 10 minutes.

(5) Experiment Result

Figure 23:
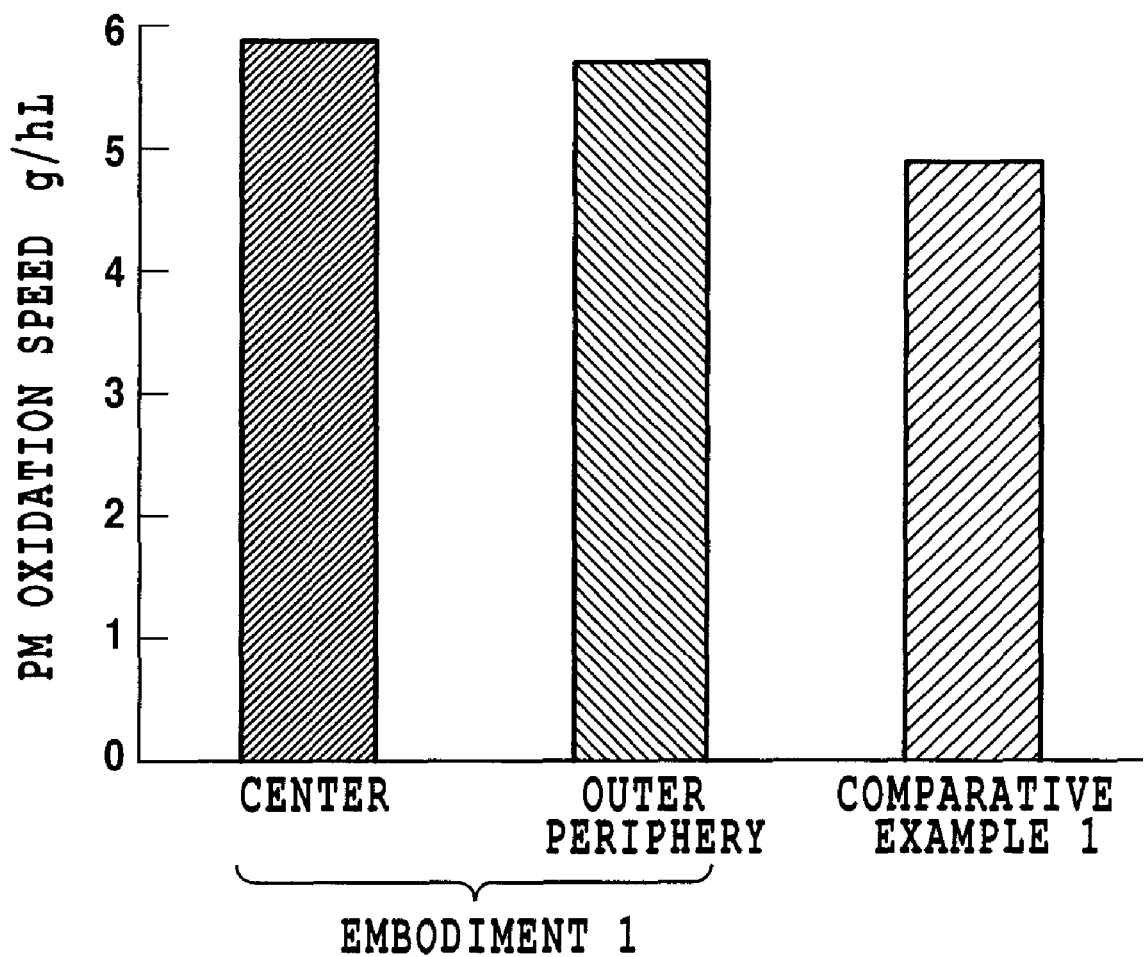
FIG. 23 is a graph showing the experiment result according to the fourth embodiment.

FIG. 23 shows a comparison in PM oxidation speed between Embodiment 1 and Comparative Example 1. As seen, in a case of Embodiment 1, the PM oxidation speed is faster than in Comparative Example 1, which shows that the effect of the present embodiment utilizing an exhaust gas heat is apparent. It should be noted that in Embodiment 1, there is almost no difference in PM oxidation speed between the central side and the outer peripheral side.

Fifth Embodiment

Next, a fifth embodiment of the present embodiment will be explained with reference to the accompanying drawings. It should be noted that components identical to those in the first embodiment are referred to as identical numerals and the detailed explanation is omitted.

Figure 24:
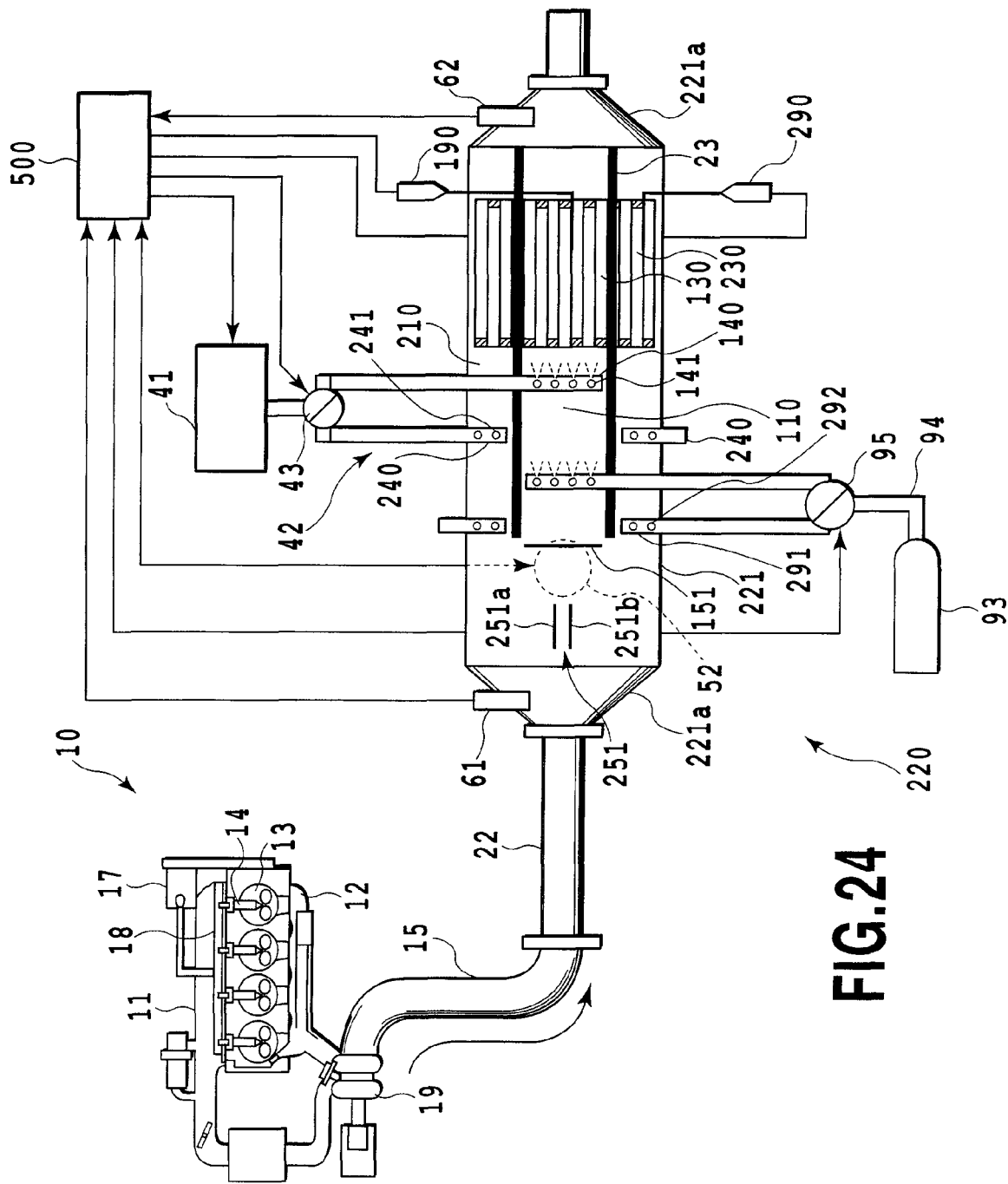
FIG. 24 is a system diagram schematically showing an exhaust purifying system for an internal combustion engine in a fifth embodiment of the present invention.

FIG. 24 is a system diagram schematically showing an exhaust purifying system for an internal combustion engine in the fifth embodiment of the present invention. As shown in the figure, in the fifth embodiment, temperature sensors 190 and 290 are added for detecting respective temperatures (floor temperature) of the central filter member 130 and the outer peripheral filter member 230. The temperature sensors 190 and 290 are connected to ECU 500. A temperature measurement portion of each of the temperature sensors 190 and 290 (tip portion) is buried in the center portion of each of the filter members 130 and 230 for accurately detecting a temperature of each of the filter members 130 and 230.

It should be noted that the temperature sensors 190 and 290 have temperature measurement portions which may be disposed in the central filter chamber 110 and the outer peripheral filter chamber 210 at the upstream side of the central filter member 130 and the outer peripheral filter member 230 for detecting a temperature of the exhaust gas flowing into the central filter member 130 and the outer peripheral filter member 230.

Air supplying nozzles 191 and 291 as cooling gas supply means for supplying cooling air as a cooling gas are disposed in the central filter chamber 110 and the outer peripheral filter chamber 210 at the upstream side of the central filter member 130 and the outer peripheral filter member 230. The construction of the air supplying nozzles 191 and 291 is the same as the ozone supplying nozzles 141 and 241. In the present embodiment, the air supplying nozzles 191 and 291 are disposed at the upstream side of the ozone supplying nozzles 141 and 241. The air supplying nozzles 191 and 291, as in the case of the ozone supplying nozzles 141 and 241, have a plurality of air supply ports 192 and 292 so as to cover an entire radial direction range of the upstream end surface of each of the filter members 130 and 230 so that the air can be supplied uniformly on the entire upstream end surface of the filter members 130 and 230, and are fixed inside the casing 221. It should be noted that the form of the cooling gas supply means is not limited to such air supplying nozzles 191 and 291, but may use a structure with only one cooling gas supply port and a gas other than air may be used as the cooling gas. An air tank 93 as a cooling gas source is connected via an air supply passage 94 to the air supplying nozzles 191 and 291. The air supply passage 94 is bifurcated in the midst and a switching valve 95 is disposed in the branch portion. The switching valve 95 is switched by ECU 500 to supply the air sent from the air tank 93 to one of the air supplying nozzles 191 and 291 or not to supply it at all. The air is injected and supplied from the air supply ports 192 and 292 of the air supplying nozzles 191 and 291 toward the downstream-side filter members 130 and 230.

In the fifth embodiment, at regeneration of the central filter member 130 or the outer peripheral filter member 230 by ozone, the air supply from each of the corresponding air supplying nozzles 191 and 291 is controlled by ECU 500 based upon a temperature detected by each of the corresponding temperature sensors 190 and 290. That is, as described in the first embodiment, regeneration of the filter member is preferably performed when the filter temperature or the atmosphere temperature is within an appropriate temperature range where PM oxidation by ozone is performed effectively. According to the fifth embodiment, it is determined whether or not the temperature is within an appropriate temperature range based upon a detection value of each of the temperature sensors 190 and 290. When it is within an appropriate temperature range, the filter regeneration is performed and when it is not, the filter regeneration is stopped. In consequence, it is prevented that the supply ozone is wastefully consumed within an inappropriate temperature range.

For example, taking regeneration of the central filter member 130 as an example, even if regeneration timing of the filter member 130 comes, when the detection temperature of the central filter member 130 is higher than a predetermined upper limit temperature (for example, 350°) due to, for example, a state immediate after a high load operation, ECU 500 stops the ozone supply (that is, the ozone generator 41 does not turn on) since the supply ozone is possibly decomposed due to heat before it reaches the filter member 130. On the other hand, when the detection temperature of the central filter member 130 is less than a predetermined lower limit temperature (for example, 150°) due to, for example, a cold operation, ECU 500 stops the ozone supply since the PM oxidation by the supply ozone is possibly not efficiently performed. On the other hand, when the detection temperature of the central filter member 130 is within a range which is less than the upper limit temperature and more than the lower limit temperature, since the PM oxidation by the supply ozone is efficiently performed, ECU 500 performs the ozone supply from the central ozone supplying nozzle 141.

On the other hand, when the detection temperature of the central filter member 130 is more than the upper limit temperature, ECU 500 switches the switching valve 95 for the side of the central air supplying nozzle 191 to perform supply of the cooling air from the air supplying nozzle 191, thereby cooling the central filter member 130. In consequence, the temperature of the central filter member 130 is lowered to be within an appropriate temperature range less than the upper limit temperature. ECU 500 then performs the ozone supply from the central ozone supplying nozzle 141. This control method is the same as at regeneration of the outer peripheral filter member 230.

In this way, according to the fifth embodiment, in addition to the effect similar to that of the first embodiment, the ozone supply can be prevented at an inappropriate temperature range, particularly an excessively high temperature, achieving further efficient use of ozone.

In regard to the fifth embodiment also, the experiment for confirming the effect was made and the experiment result is shown below.

(1) Experiment Device

It is the same as in the first embodiment.

(2) Experiment Condition

It is the same as in the first embodiment except for a point of changing the operating condition of the engine 10 into a rotational speed of 2400 rpm and torque of 77 Nm. The reason for setting the operating condition herein to a higher-load side is to increase an exhaust gas temperature. In a case of this operating condition, the exhaust gas temperature reaches 300 and several 10° C.

(3) Method of Calculating PM Oxidation Speeds

It is the same as in the first embodiment.

(4) Embodiment and Comparative Example

Embodiment 2

The outer peripheral valve body 251 is closed and the central valve body 151 is open to flow the exhaust gas from the engine only into the central filter chamber 110. This state is kept for 30 minutes. For this duration, PM is deposited in the central filter member 130 and a temperature of the central filter member 130 increases to a relatively high temperature. Thereafter, the outer peripheral valve body 251 is open and the central valve body 151 is closed to flow the exhaust gas only into the outer peripheral filter chamber 210 and to block flow of the exhaust gas into the central filter chamber 110. In this state, air is supplied from the central air supplying nozzle 191 to the central filter chamber 110 to control a temperature detected by the central temperature sensor 190 to be within a range of 245° C. to 255° C. In this state, the supply gas containing ozone is supplied to the central filter chamber 110, thereby oxidizing PM deposited in the central filter member 130 for 10 minutes.

Comparative Example 2

Comparative Example 2 uses an experiment device similar to that of Embodiment 2, but the following point is different from Embodiment 2. That is, after the flow of the exhaust gas is switched from the outer peripheral filter chamber 210 to the central filter chamber 110, the supply gas is supplied to the central filter chamber 110 without air supply from the central air supplying nozzle 191 or the temperature control to oxidize PM deposited in the central filter member 130 for 10 minutes. At this point, the temperature was a range of 295° C. to 283° C.

(5) Experiment Result

Figure 25:
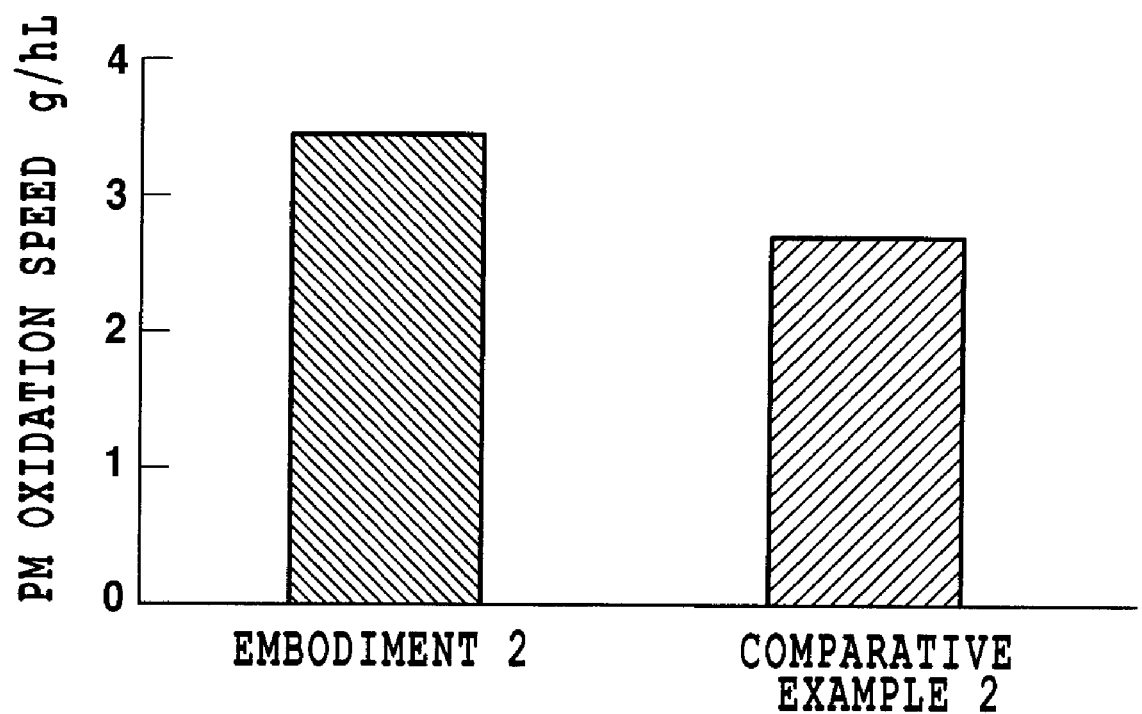
FIG. 25 is a graph showing the experiment result according to the fifth embodiment.

FIG. 25 shows a comparison in PM oxidation speed between Embodiment 2 and Comparative Example 2. As seen, in a case of Embodiment 2, the PM oxidation speed is faster than that of Comparative Example 2. This shows that the advantage of the present embodiment for performing ozone supply within a more appropriate temperature range by air supply is apparent.

Figure 26:
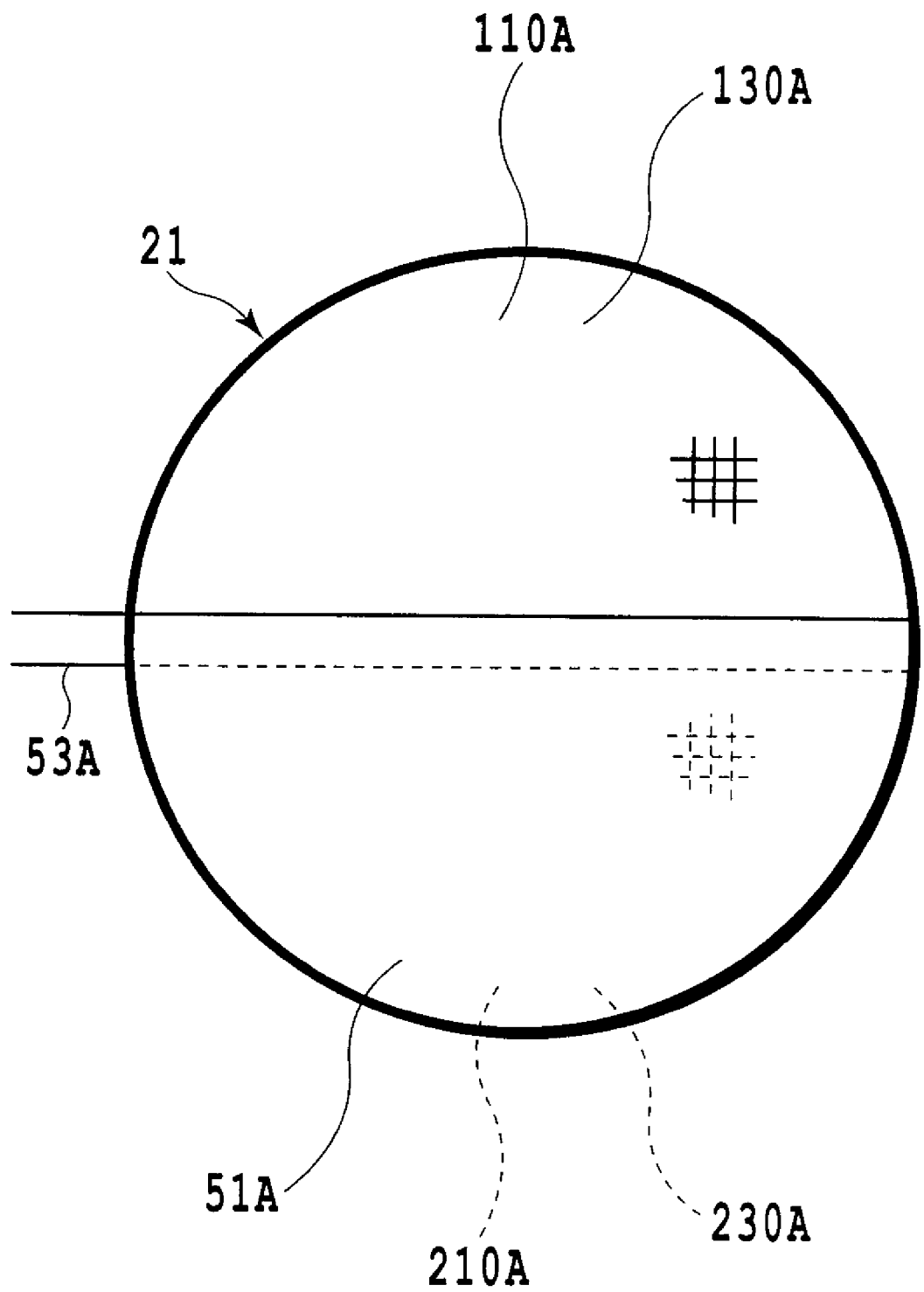
FIG. 26 is a schematic front view showing another embodiment of the present invention.

As described above, the fourth and fifth embodiments of the present invention are explained, but the present invention may use other embodiments. For example, as shown in FIG. 26, an inside of the casing 22 may be divided longitudinally on a plane along an axial direction into two pieces to form filter chambers 110A and 210A. In this case, the aforementioned, respective construction elements such as filter members 130A and 230A, ozone supplying nozzles (not shown) are disposed in each of the filter chambers 110A and 210A. In addition, one semicircle valve body 51A is rotated by 180° through a rotational shaft 53A corresponding to the filter chamber for performing the ozone supply to alternately open/close the filter chambers 110A and 210A. When the ozone supply is not performed, the valve body 51A is held horizontally to permit the exhaust gas flow into both the filter chambers 110A and 210A. When the longitudinally divided structure and the double pipe structure in the aforementioned embodiment are compared, the double pipe structure has an advantage in a point that heat transfer from one filter chamber to the other filter chamber can be made in a broad range in all the peripheral direction and a disadvantage in a point of a slightly complicated structure as compared to the longitudinally divided structure.

In each of the fourth and fifth embodiments, the two filter chambers and the construction elements corresponding thereto are disposed, but three or more may be used. In addition, the wall flow type DPF is used as a PM collection device, but besides, may use various filter structures. For example, an electrostatic straight flow type filter may be used. This filter generates discharge by applying a direct voltage between a pair of electrodes existing in the exhaust gas and for example, PM is charged with negative to be absorbed to an electrode in a positive side or a ground side. Accordingly, the PM collection device is formed as an electrode in a positive side or a ground side.

In addition, in each of the embodiments, an operation of each of the switching valve 43 and the valve means 50 is composed of two states of fully open and fully closed states, but in place of such a stepped state change, it is possible to use a switching valve and valve means which can continuously change a rate of an emission amount in two directions of the exhaust gas side.

It should be noted that in each of the embodiments, the present invention is explained in detail to some degree, but it should be understood that the present invention can make various modifications and alternations without departure from the spirit and the scope of the invention described in claims. That is, the present invention includes modifications and alternations contained in the scope of claims, equivalents thereof, and the purpose thereof.

The present invention may be applied to, besides a diesel engine as a compression ignition type internal combustion engine, all internal combustion engines which possibly generate PM. For example, the present invention may be applied to a direct-injection spark ignition internal combustion engine, in more detail, a direct-injection lean burning gasoline engine. In this engine, fuel is directly injected into an in-cylinder combustion chamber, but there is a possibility that in a high load region having a large number of fuel injection, fuel does not completely burn and generates PM. Even if the present invention is applied to such an engine, the advantage similar to the aforementioned can be sufficiently expected.

INDUSTRIAL APPLICABILITY

The present invention can be used for effectively using ozone at the time of oxidizing and removing PM by using ozone.

The invention claimed is:

1. An exhaust purifying system for an internal combustion engine comprising:
    a plurality of particulate matter collecting devices branched and connected to an exhaust passage for collecting particulate matter in an exhaust gas;
    ozone supplying means for supplying ozone to the upstream side of each of said plurality of particulate matter collecting devices; and
    controlling means for changing a ratio of a supply amount of the exhaust gas and a ratio of a supply amount of the ozone between said plurality of particulate matter collecting devices.

2. An exhaust purifying system for an internal combustion engine according to claim 1, further comprising:
    at least one catalyst device disposed in the exhaust passage at the upstream side of said plurality of particulate matter collecting devices to remove a certain substance in the exhaust gas.

3. An exhaust purifying system for an internal combustion engine according to claim 1 or 2, further comprising:
    collection amount detecting means for individually detecting a collection amount of each of said plurality of particulate matter collecting devices; and
    temperature detecting means for individually detecting a temperature of each of said plurality of particulate matter collecting devices, wherein:
    the controlling means controls the ratio of the supply amount of the exhaust gas based upon the collection amount detected by the collection amount detecting means and controls the ratio of the supply amount of the ozone based upon the temperature detected by the temperature detecting means.

4. An exhaust purifying system for an internal combustion engine according to any of claims 1 to 3, wherein:
    the controlling means makes the ratio of the supply amount of the ozone to the particulate matter collecting device in which the ratio of the supply amount of the exhaust gas is made relatively small relatively large.

5. An exhaust purifying system for an internal combustion engine according to any of claims 1 to 4, wherein:
    passages of the exhaust gas to said plurality of particulate matter collecting devices are individually and fully closed; and
    passages of the ozone to said plurality of particulate matter collecting devices are individually and fully closed.

6. An exhaust purifying system for an internal combustion engine according to any of claims 1 to 5, further comprising:
    collection amount detecting means for individually detecting a collection amount of each of said plurality of particulate matter collecting devices, wherein:
    the controlling means selects the particulate matter collecting device in which the collection amount is small among said plurality of particulate matter collecting devices, as an object for supplying the exhaust gas.

7. An exhaust purifying system for an internal combustion engine according to any of claims 3 to 6, wherein:
    the controlling means, in a case where the temperature in the particulate matter collecting device in which the collection amount is relatively large among said plurality of particulate matter collecting devices is less than a predetermined low temperature-side reference value, sets a supply amount of the ozone to the particulate matter collecting device at a predetermined maximum amount and in a case where the temperature in the particulate matter collecting device is more than the predetermined low temperature-side reference value, set a supply amount of the ozone to the particulate matter collecting device based upon NOx density in the exhaust gas.

8. An exhaust purifying system for an internal combustion engine according to any of claims 3 to 7, wherein:
    the controlling means, in a case where the temperature in the particulate matter collecting device in which the collection amount is relatively large among said plurality of particulate matter collecting devices is less than a predetermined low temperature-side reference value, selects the particulate matter collecting device in which the collection amount is relatively small, as an object for supplying the ozone.

9. An exhaust purifying system for an internal combustion engine according to any of claims 3 to 8, wherein:
    the controlling means stops the supply of the ozone from the ozone supplying means in a case where the temperature exceeds a predetermined high-temperature reference value.

10. An exhaust purifying system for an internal combustion engine according to any of claims 3 to 9, wherein:
    said plurality of particulate matter collecting devices further comprises temperature increasing means, wherein:
    the controlling means controls the temperature increasing means to increase a temperature of the particulate matter collecting device in a case where the temperature of the particulate matter collecting device selected as the object for supplying the exhaust gas exceeds a predetermined high-temperature reference value.

11. An exhaust purifying system for an internal combustion engine according to claim 2, further comprising:
    catalyst temperature detecting means for detecting a temperature of at least the one catalyst device, wherein:
    the controlling means controls the ozone supplying means based upon the temperature of at least the one catalyst device.

12. An exhaust purifying system for an internal combustion engine according to any of claims 1 to 11, further comprising:
    an exhaust control valve at a branch point of the exhaust passage for changing the ratio of the supply amount of the exhaust gas between said plurality of particulate matter collecting devices.

13. An exhaust purifying system for an internal combustion engine according to any of claims 1 to 12, wherein:
    the ozone supplying means is provided with an ozone control valve for changing the ratio of the supply amount of the ozone from a single ozone supplying source between said plurality of particulate matter collecting devices.

14. An exhaust purifying system for an internal combustion engine according to claim 1, wherein:
    the particulate matter collecting device includes:
    a plurality of filter chambers neighboring with each other and defined in parallel to the flow direction of the exhaust gas in a single casing;
    a filter member disposed in each of the filter chambers; and
    valve means for switching the filter chamber into which the exhaust gas enters, wherein:
    the ozone supplying means is disposed in each of the plurality of the filter chambers; and
    the valve means is disposed at the upstream side of the ozone supplying means.

15. An exhaust purifying system for an internal combustion engine according to claim 14, wherein:
the filter chamber includes two chambers formed in a central portion and in an outer peripheral portion inside the casing.

16. An exhaust purifying system for an internal combustion engine according to claim 14 or 15, wherein:
the valve means switches the filter chamber so that the exhaust gas does not enter into the filter chamber to which the ozone is supplied from the ozone supplying means and the exhaust gas enters into the filter chamber to which the ozone is not supplied from the ozone supplying means.

17. An exhaust purifying system for an internal combustion engine according to claim 14 or 16, wherein:
the valve means includes:
a first valve body for opening/closing a filter chamber of a part of the plurality of the filter chambers;
a second valve body for opening/closing the rest of the plurality of the filter chambers; and
drive means for driving the first valve body and the second valve body so that the first valve body and the second valve body alternately open and close in accordance with the filter chamber in which the ozone is supplied.

18. An exhaust purifying system for an internal combustion engine according to claim 14 or 17, further comprising:
at least one temperature detecting means for detecting a temperature of the gas entering into at least one of the filter members or a temperature of the one of the filter members; and
means for controlling the supply of the ozone from the ozone supplying means corresponding to the filter chamber.

19. An exhaust purifying system for an internal combustion engine according to claim 18, further comprising:
cooling gas supplying means disposed between at least the one filter member and the valve means for supplying a cooling gas to the one filter member from the upstream side thereof; and
means for controlling the cooling gas supply from the cooling gas supplying means in accordance with the detected temperature.

* * * * *